United States Patent
Onyia et al.

(10) Patent No.: US 6,473,696 B1
(45) Date of Patent: Oct. 29, 2002

(54) METHOD AND PROCESS FOR PREDICTION OF SUBSURFACE FLUID AND ROCK PRESSURES IN THE EARTH

(75) Inventors: Ernest C. Onyia, Maurice, LA (US); David W. Bell, Ponca City, OK (US); Alan Royce Huffman, The Woodlands; Richard Wayne Lahann, Houston, both of TX (US)

(73) Assignee: Conoco Inc., Houston, TX (US)

( * ) Notice: Subject to any disclaimer, the term of this patent is extended or adjusted under 35 U.S.C. 154(b) by 16 days.

(21) Appl. No.: 09/805,422

(22) Filed: Mar. 13, 2001

Related U.S. Application Data

(63) Continuation of application No. 09/443,446, filed on Nov. 4, 1999.

(51) Int. Cl.[7] .................................................. G01V 1/28
(52) U.S. Cl. ............................................. 702/6; 702/14
(58) Field of Search ......................... 702/14, 16, 6, 702/7, 8, 11; 703/10; 367/73, 72

(56) References Cited

U.S. PATENT DOCUMENTS

| | | | |
|---|---|---|---|
| 5,081,612 A | 1/1992 | Scott et al. | 367/38 |
| 5,128,866 A | 7/1992 | Weakley | 364/421 |
| 5,130,949 A | 7/1992 | Kan et al. | 367/27 |
| 5,200,929 A | 4/1993 | Bowers | 367/38 |
| 5,233,568 A | 8/1993 | Kan et al. | 367/27 |
| 5,343,440 A | 8/1994 | Kan et al. | 367/27 |
| 5,583,825 A | 12/1996 | Carrazzone et al. | 367/31 |
| 5,615,115 A | 3/1997 | Shilling | 364/421 |
| 5,937,362 A | 8/1999 | Lindsay et al. | 702/9 |

OTHER PUBLICATIONS

G.L. Bowers: Pore Pressure Estimation From Velocity Data: Accounting for Overpressure mechanisms Besides Undercompaction, IADS/SPE 27488, IADC/SPE Drilling Conference, Feb. 15–18, 1994, pp. 515–530.

Kenneth Duffaut et al.; Shear–wave elastic impedance, The Leading Edge, Nov. 2000, pp. 1222, 1224, 1226, 1228–1229.

Robert Garotta et al.; Defining Seismic Velocities and Density from P and S (or PS) Seismic Data, SEG/EAGE Summer Research Workshop, Oct. 1–6, 2000, pp. 1884–1888.

(List continued on next page.)

*Primary Examiner*—Donald E. McElheny, Jr.
(74) *Attorney, Agent, or Firm*—Madan, Mossman & Sriram, P.C.

(57) ABSTRACT

A method of determination of fluid pressures in a subsurface region of the earth uses seismic velocities and calibrations relating the seismic velocities to the effective stress on the subsurface sediments. The seismic velocities may be keyed to defined seismic horizons and may be obtained from many methods, including velocity spectra, post-stack inversion, pre-stack inversion, VSP or tomography. Overburden stresses may be obtained from density logs, relations between density and velocity, or front inversion of potential fields data. The seismic data may be P-P, P-S, or S-S data. The calibrations may be predetermined or may be derived from well information including well logs and well pressure measurements. The calibrations may also include the effect of unloading. The determined pressures may be used in the analysis of fluid flow in reservoirs, basin and prospect modeling and in fault integrity analysis.

51 Claims, 23 Drawing Sheets

OTHER PUBLICATIONS

Milos Savic et al.; Elastic Impedance Inversion in Practice, Seg. Expanded Abstracts, 2000, Figs. 1–4.

Subhashis Mallick et al.; Hybrid seismic inversion: A reconnaissance tool for deepwater exploration, The Leading Edge, Nov. 2000, pp. 1230–1237.

Patrick Connolly; Elastic impedance, The Leading Edge, Apr. 1999, pp. 438–452.

W. R. Matthews et al.; How to predict formation pressure and fracture gradient . . . from electric and sonic logs, The Oil and Gas Journal, pp. 431–437.

Erich Gamma et al.; Design Patterns Elements of Reusable Object–Oriented Software, pp. 293–303.

C. E. Hottman et al.; Estimation of Formation Pressures from Log–Derived Shale Properties, Journal of Petroleum Technology, Jun. 1965, pp. 717–722.

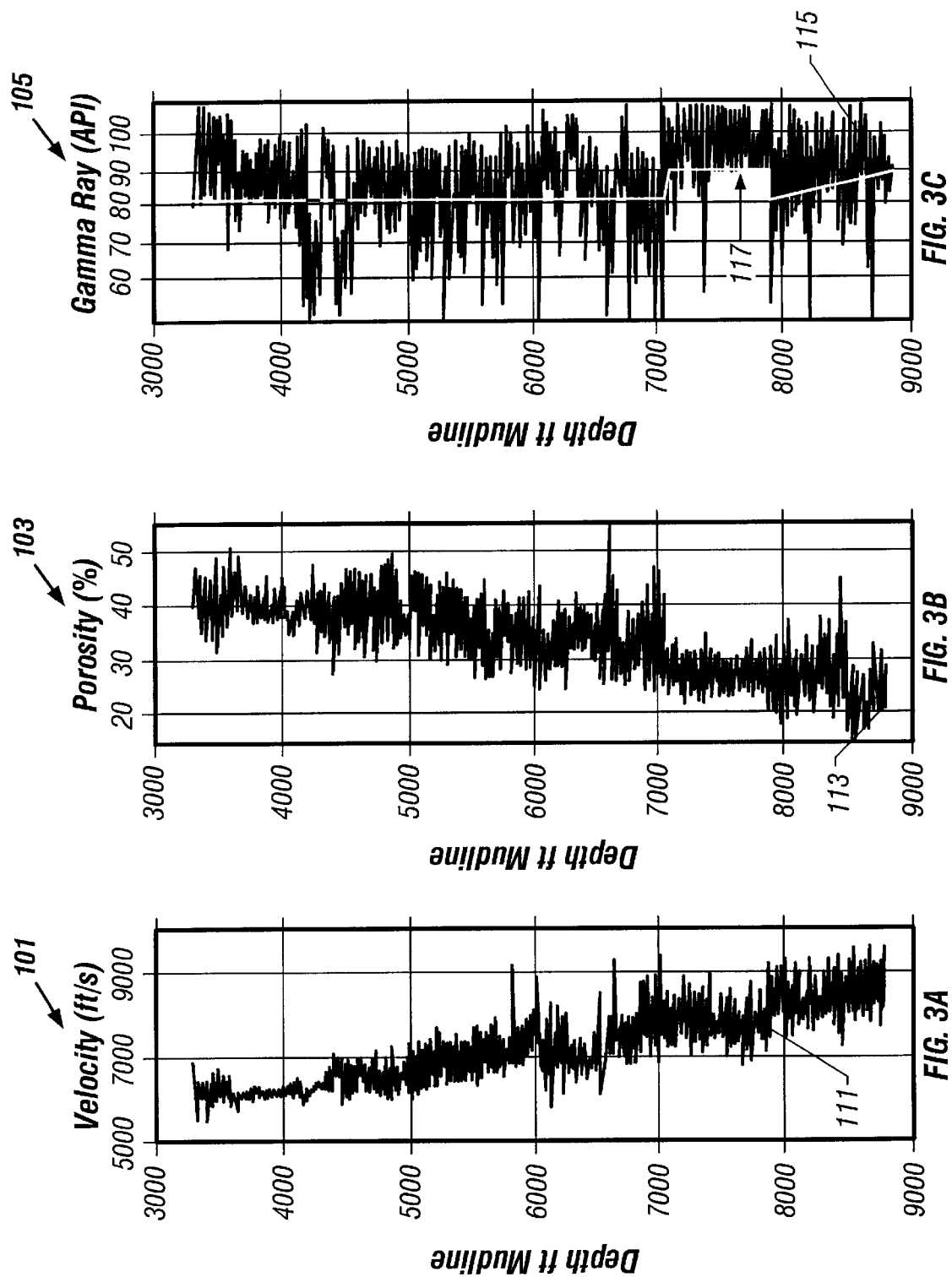

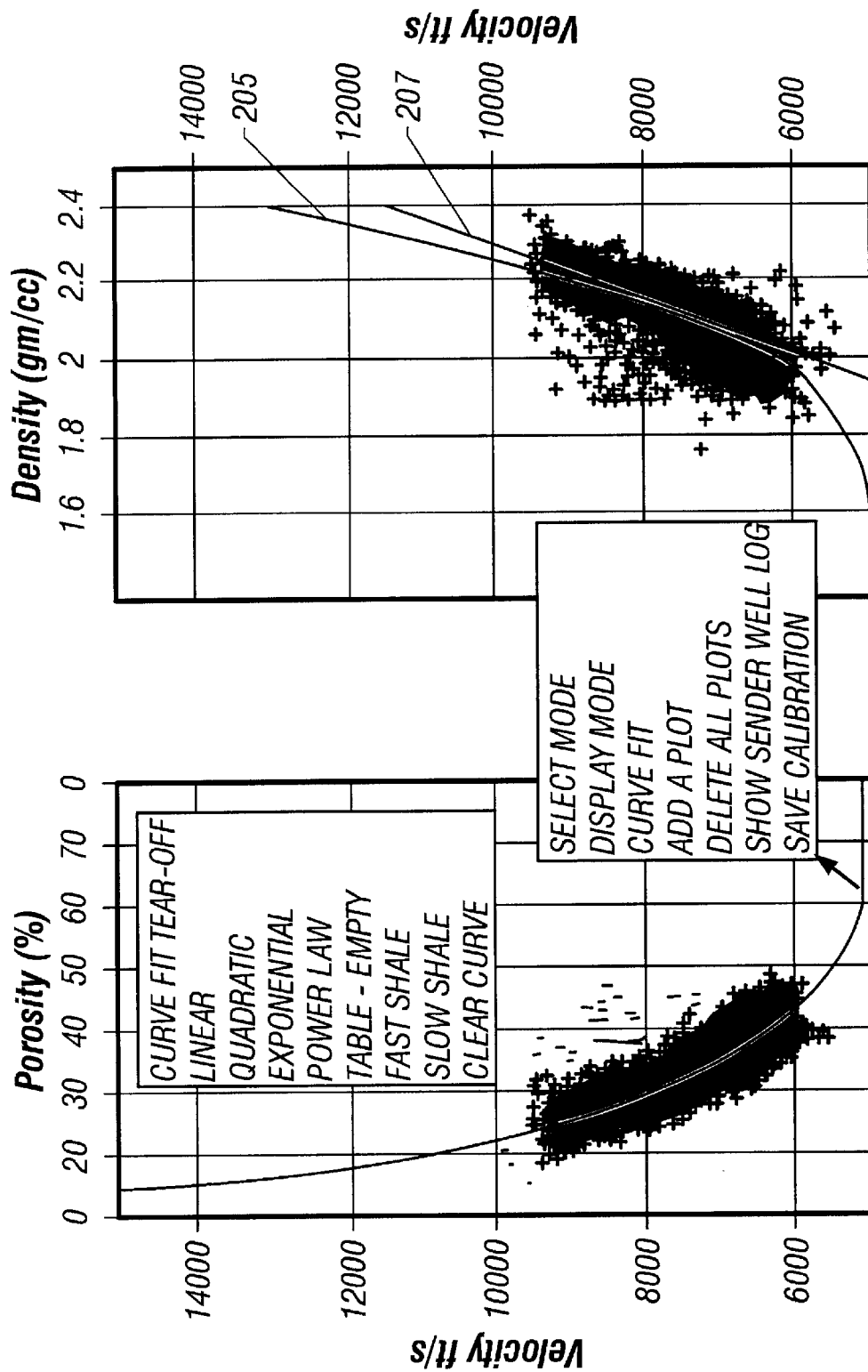

METHOD AND PROCESS FOR PREDICTION OF SUBSURFACE FLUID AND ROCK PRESSURES IN THE EARTH

CROSS-REFERENCES TO RELATED APPLICATIONS

The present application is a continuation of application Ser. No. 09/433,446 filed on Nov. 4, 1999.

BACKGROUND OF THE INVENTION

1. Field of the Invention

The present invention relates generally to geophysical exploration and more particularly to methods for accurately estimating fluid and overburden pressures in the earth's subsurface on local, prospect and basin-wide scales.

2. Background of the Art

During drilling of a borehole, drilling fluids, usually referred to as "mud," are circulated in the borehole to cool and lubricate the drill bit, flush cuttings from the bottom of the hole, carry cuttings to the surface, and balance formation pressures encountered by the borehole. It is desirable to keep rotary drilling mud weights as light as possible, but above the formation pore fluid pressure, to most economically penetrate the earth; heavier muds may break down rocks penetrated by the borehole and thereby cause loss of mud. Mud weight is carefully monitored and may be increased during drilling operations to compensate for expected increases in the formation fluid pressure. In some areas, however, there may be unexpected abnormal increases in pressure, with depth such that mud weight does not compensate pressure; the result can be blowout of the well.

Normal pressures refer to formation pressures that are approximately equal to the hydrostatic head of a column of water of equal depth. If the formation were opened to the atmosphere, a column of water from the ground surface to the subsurface formation depth could balance the formation pressure. In many sedimentary basins, shallow predominantly sandy formations contain fluids that are under hydrostatic pressure.

At a number of offshore locations, abnormally high pore pressures have been found even at relatively shallow sub-sea bottom depths (less than about 1500 meters). This could occur if a sand body containing large amounts of water is covered by silt or clay and buried. The dewatering of clays may result in the formation of relatively impermeable shale layers that slow down the expulsion of water from the underlying sand. The result of this is that the sand may retain high amounts of fluid and the pore pressure in the sand exceeds that which would normally be expected from hydrostatic considerations alone, i.e., the fluid pressure exceeds that which would be expected for a column of water of equivalent height. This phenomenon of overpressuring is well known to those versed in the art and is commonly referred to as "geopressure."

It is desirable to set casing in a borehole immediately above the top of a geopressured formation and then to increase mud weight for pressure control during further drilling. Setting a casing string which spans normal or low pressure formations permits the use of very heavy drilling muds without risking breaking down of borehole walls and subsequent lost mud in the shallower interval. On the other hand, should substitution of heavy drilling mud be delayed until the drill bit has penetrated a permeable overpressurized formation (e.g., sandstone), loss of well control or blowout may occur.

In areas where there is reason to suspect existence of such high pressure formations, various techniques have been followed in attempts to locate such geopressure zones. For example, acoustic or electric logs have been run repeatedly after short intervals of borehole have been drilled or are acquired using measurement-while-drilling techniques, and a plot of acoustic velocity or electrical resistance or conductivity as a function of depth has been made. Abnormal variations of acoustic velocity and/or electrical properties obtained by logging may indicate that the borehole has penetrated a zone of increasing formation pressure. Such techniques are very expensive and time-consuming and cannot predict what pressures will be encountered ahead of the bit.

Several methods are known in the art for estimating pore pressures in formations, using well log data and also from seismic survey information. One such method is well known in the art as the "Eaton" method, and is described at Eaton, "The Equation for Geopressure Prediction from Well Logs" SPE 5544 (Society of Petroleum Engineers of AIME, 1975). The Eaton method of determining pore pressures begins with determination of the so-called "normal compaction trend line" based upon sonic, resistivity, conductivity, or d-exponent data obtained by way of well logs. The normal compaction trend line corresponds to the increase in formation density (indicated by sonic travel time, resistivity or conductivity) that would be expected as a function of increasing depth due to the increasing hydrostatic pressure that forces fluids out from the formations and thus decreases the sonic travel time (increases the velocity), assuming the absence of geopressure. This normal compaction trend line may be determined solely from the sonic travel time, conductivity, or resistivity well log data, or may be adjusted to reflect extrinsic knowledge about the particular formations of interest. The Eaton method calculates pore pressure by correlating the measured density information, expressed as an overburden gradient over depth, to deviations in measured sonic travel time, (or electrical resistivity or conductivity) from the normal compaction trend line at specific depths. The pore pressure calculated from the Eaton equations has been determined to be quite accurate, and is widely used in conventional well planning.

Specifically, the Eaton method determines a pressure gradient according to the relation $$G_p = G_o - (G_o - G_n)\left[\frac{\Delta t_{normal}}{\Delta t_{observed}}\right]^3 \quad (1)$$

where $G_P$ is the formation pressure gradient (psi/ft), $G_O$ is the overburden gradient, $G_N$ is the normal gradient, $\Delta t_{normal}$ is the normal transit time and $\Delta t_{observed}$ is the observed transit time.

However, application of the Eaton method has been limited to the immediate locations of existing wells, as it depends on well log data. It is of course desirable to estimate pore pressure at locations at the sites of proposed new wells, and thus away from currently existing wells, particularly to identify locations at which production will be acceptable at a low drilling cost (e.g., minimal use of intermediate casing). In addition, knowledge of pore pressure at locations away from existing wells enables intelligent deviated or offset drilling, for example to avoid overpressurized zones.

Kan (U.S. Pat. No. 5,130,949) teaches a method in which seismic data is combined with well log data to generate a two-dimensional geopressure prediction display; this permits deviated and horizontal well planning plus lithology detection. Shale fraction analysis, compaction trend, and seismic velocity may be automatically or interactively generated on a computer work station with graphics displays to avoid anomalous results. Corrections to velocity predictions by check shots or VSP, and translation of trend curves for laterally offset areas increases accuracy of the geopressure predictions. In particular, Kan '949 determines the transit time from sonic logs for compressional waves in predominantly shaly sections and expresses the pore pressure gradient (PPG) in terms of the transit time departure from the compaction trend line, $\delta\Delta t$, as $$PPG = 0.465 + C_1(\delta\Delta t) + C_2(\delta\Delta t)^2 \qquad (2)$$

Coefficient $C_1$ typically varies from 0.002 to 0.02 if the transit time is expressed in microseconds per foot and the PPG is measured in psi/ft. $C_2$ may be positive or negative.

Kan '949 also teaches the use of vertical seismic profile (VSP) data for calibration of the sonic log data. Kan (U.S. Pat. No. 5,343,440) and Weakley (U.S. Pat. No. 5,128,866) further teach the use of coherency analysis of surface seismic data for determination of interval velocities.

Scott (U.S. Pat. No. 5,081,612) teaches a variation of the Eaton method in which an equation of the form $$V_c = V_1(1 - a_1 L - a_2 \phi + a_3 P) \qquad (3)$$

where $a_1$, $a_2$ and $a_3$ are constants, $V_1$ is a constant, $V_c$ is calculated velocity, L is the lithology of the formation, $\phi$ is the porosity and P is the effective pressure (difference between the overburden pressure and the formation fluid pressure). The compaction of the sediments is governed by an equation of the form $$\phi = \phi_0 e^{-a_4 P} \qquad (4)$$

A reference model for the sedimentary basin is developed assuming compaction under hydrostatic pore pressure. A reference effective pressure and a reference velocity profile are obtained. An iterative procedure is used in which the lithology may be varied with depth and the reference velocity profile is compared to a velocity profile obtained from seismic data.

In addition to undercompaction, Bowers (U.S. Pat. No. 5,200,929) discusses a second cause of overpressuring. Abnormally high pressure can also be generated by thermal expansion of the pore fluid ("aquathermal pressuring"), hydrocarbon maturation, charging from other zones, and expulsion/expansion of intergranular water during clay diagenesis. With these mechanisms, overpressure results from the rock matrix constraining expansion of the pore fluid. Unlike undercompaction, fluid expansion can cause the pore fluid pressure to increase at a faster rate than the overburden stress. When this occurs, the effective stress decreases as burial continues. The formation is said to be "unloading." Since sonic velocity is a function of the effective stress, the velocity also decreases and a "velocity reversal zone" develops. A velocity reversal zone is an interval on a graph depicting sonic velocity as a function of depth along a well in which the velocities are all less than the value at some shallower depth.

A large portion of the porosity loss that occurs during compaction is permanent; it remains "locked in" even when the effective stress is reduced by fluid expansion. A formation that has experienced a greater effective stress than its current value will be more compacted and have a higher velocity than a formation that has not. Consequently, the relationship between sonic velocity and effective stress is no longer unique when unloading occurs. In other words, for every effective stress, there is no longer one unique sonic velocity. The sonic velocity follows a different, faster velocity-effective stress relationship during unloading than it did when the effective stress was building. This lack of uniqueness is called "hysteresis." Since fluid expansion causes unloading, while undercompaction does not, hysteresis effects make the sonic velocity less responsive to overpressure generated by fluid expansion. As a result, the pore fluid pressure corresponding to a given sonic velocity at given depth within a velocity reversal zone can be significantly greater if the overpressure was caused by fluid expansion rather than undercompaction. Therefore, the sonic velocity of an overpressured formation is indirectly dependent upon both the magnitude and the cause of overpressure. To account for different causes of overpressuring, Bowers teaches the use of two different velocity-effective stress relations: one relation applies when the current effective stress is the highest ever experienced by a subterranean formation and a second relation that accounts for hysteresis effects is used when the effective stress has been reduced. Pore fluid pressure is found by subtracting the computed effective stress from the overburden stress. Bowers uses a relationship of the form $$V = C + A[\sigma_{max}(\sigma/\sigma_{max})^{(1/U)}]^{(1/B)} \qquad (5)$$

for the effect of unloading. In eq. (5) $\sigma_{max}$ is the maximum stress to which the rock has been subjected. The unloading curve parameter U is a measure of how plastic the sediment is, with $U=1$ and $U=\infty$ defining the two limiting cases. For $U=1$, the unloading curve is the same as the loading curve whereas for $U=\infty$ the velocity remains fixed at a value $V_{max}$ determined by the stress $\sigma_{max}$.

SUMMARY OF THE INVENTION

The invention provides a methodology, process and computer software for the prediction of fluid and rock pressures in the subsurface using geophysical and geological data. The method includes techniques for velocity analysis from seismic data that are used to drive the pressure prediction, as well as an integrated approach to deriving pressure data that is new and novel in nature and scope. The invention addresses the prediction of pressure information for three scales of analysis including (1) basin-scale (10–500 km spatial lengths) analysis of hydrocarbon systems, (2) prospect-scale (1–10 km spatial length) analysis of fluid flow that can be used to analyze fluid movement in localized areas, and (3) prediction of pressure conditions at a specific location (0–1 km spatial length) where a well is to be drilled. The results of the prediction can be utilized in a range of other applications that address the fundamental behavior of hydrocarbon systems and can improve the ability to find commercial quantities of hydrocarbons in the subsurface. The results can also be used to design and optimize well planning.

The technique and computer software estimates fluid pressure (from overburden stress and seismic velocities), fracture gradient (when effective stress=0), overburden pressure (from integration of density logs, using the Gardner-Gardner-Gregory relations with velocity estimates from sonic logs or seismically derived seismic velocities, or a combination of seismic data and Gravity/Magnetic data), effective stress (from seismic data) and porosity (from seismic data) for well planning, basin-scale pressure fields and prospect-scale pressure fields, and also can generate predictions and interpretations that are applicable to:

hydrocarbon maturation fluid migration lateral and vertical seal rock integrity reservoir-specific lateral pressure changes fault-seal properties effects of hydrocarbon reservoirs on pressure prediction effects of anomalous lithologic intervals on pressure prediction and overburden estimation The software provides an operating environment in which all data pertinent to predicting subsurface rock and fluid pressures can be stored, displayed in tabular and graphical forms, analyzed, calibrated and used in the prediction process.

The software provides the user with three pressure prediction algorithms, the Eaton method, the effective stress method, and the equivalent depth method, and allows a range of curve fitting options for each method including linear, power law, exponential, and quadratic functions.

The computer software allows large amounts of seismic velocity data to be processed and analyzed with the results being displayed on a display of a migrated or stacked seismic section. The software allows seismic data from an entire 2-D seismic line, a set of multiple 2-D seismic lines, or a 3-D seismic volume to be processed and displayed with the related seismic and well data.

The computer software allows calibration functions and prediction computations to be constrained by geologic boundaries such as horizons and faults so that multiple calibrations can be applied to areas with complex geological loading histories.

The technique and computer software use multiple data types and handle them in an integrated fashion. The data include seismic and well-based velocity information (such as from VSP data and sonic logs), geologic boundaries such as horizons and faults mapped from the seismic data, pressure data from wellbores, well log data, and digital seismic data in standard industry formats.

The computer software has the ability to read data in generic text formats and in standard formats such as would be generated by well logging contractors, seismic processing contractors, or commercial seismic interpretation systems. The data can be displayed in various tabular and graphical forms. The software provides display capability that includes interactive viewing and analysis of multiple data types simultaneously so that the user can evaluate all of these data at once. Related data can be calibrated using a variety of functional equations that are appropriate for pressure prediction.

The technique and software contains a calibration module that includes a method and means to display, edit, and datum a variety of well logs, and fit calibration curves to the logs or estimate equation coefficients and exponents for a specific prediction method (such as the Eaton method, the Bowers method, the effective depth method). The displays include depth versus log value displays along with cross-plot displays for various log parameters and plots of velocity versus effective stress. The depth and crossplot displays are linked interactively to a scrollable coefficient display window that allows the user to modify the coefficients of the equation and observe the resulting change in the graphical display in real time. The calibrations can be performed using all of the methods and equations known to experts versed in the art including but not limited to the Eaton method, the effective stress method and the equivalent depth method. The calibration module includes a method and means for using a variety of mathematical fits including linear, exponential, power law and quadratic forms that encompass the full range of possible mathematical forms for pressure relationships in the subsurface. The calibration module allows the calibration to equation form of effective stress versus velocity, velocity versus density, velocity versus porosity, density versus porosity, and fracture gradient versus depth. These equations can be defined for any subset of a set of well log data that the user selects, for example, on the basis of a lithological or other discriminator applied to the data, or by selecting a specific geological interval that is defined by certain characteristics and specific mapped geologic boundaries.

The calibration module also allows the calibration of unloading hysteresis for zones where the velocity has decreased due to secondary pressure conditions. This is determined by fitting the velocity and stress data for the unloaded zone to a relationship for unloading.

The calibration module includes interactive graphical displays of velocity, pore pressure, effective stress, overburden and fracture gradient versus depth and or time with horizons and faults posted on the displays.

The technique and software contains a prediction module that includes a method and means to display seismic velocity data along with displays of stacked or migrated seismic data with horizons, faults and an attribute of choice from a range of velocity and pressure data types plus the same calibration displays above.

The prediction module applies the calibration curves or equations to the data at each seismic velocity location in order to calculate such attributes as pore pressure, effective stress, fracture gradient, overburden, and porosity.

The prediction module can store in memory the calculated attributes as functions of time or depth for later display and analysis.

The prediction module displays the stacked seismic data with interpreted horizons and faults, and pore pressure or other attribute underpayment in color during the analysis that can be used interactively during the prediction of pressures.

The prediction module includes interactive graphical displays of velocity, pore pressure, effective stress, overburden, density, porosity and fracture gradient versus depth and or time with horizons and faults posted on the displays, seismic sections and base maps.

The technique and software contains a method and means to generate digital files of the predicted attributes in appropriate formats for other mapping packages, and transfer these files to a computer medium appropriate for transfer to other computer software. Prediction results can be output in time or depth for subsequent import into seismic interpretation systems.

The software contains a method and means to display seismic scale overlay plots of pressure and other attributes and depth plots for each location analyzed. The predicted attributes include, but are not limited to the following:

pore pressure as a function of depth or time effective pressure as a function of depth or time overburden as a function of depth or time fracture gradient as a function of depth or time porosity as a function of depth or time excess pressure as a function of depth or time unloading pressure as a function of depth or time The technique and software includes a method and means to use velocities from one or more sources including but not limited to one or more of the following:

stacking velocity data
coherency inversion velocity data
pre-stack inversion P-wave velocity
post-stack inversion P-wave velocity
pre-stack inversion S-wave velocity
post-stack inversion S-wave velocity
shear-wave stacking velocity data
tomographic P-wave velocities
tomographic S-wave velocities
VSP velocity data
VSP look-ahead inversion
sonic logs
dipole sonic logs
mode-converted shear wave velocities
combined Vp and Vs inversion The method includes use of all of the above velocity types for pressure prediction with horizon-keyed constraints. The technique also claims first use of some of the velocity types above without horizon-keyed constraints. These include the following:

pre-stack inversion P-wave velocity
post-stack inversion P-wave velocity
pre-stack inversion S-wave velocity
post-stack inversion S-wave velocity
shear-wave stacking velocity data
tomographic P-wave velocities
tomographic S-wave velocities
VSP look-ahead inversion
dipole sonic logs
mode-converted shear wave velocities
combined Vp and Vs inversion The technique and software includes a method and means for picking seismic stacking velocities using a horizon-keyed and fault-keyed approach. This means that, unlike conventional seismic-velocity picking methods that use the strongest semblances from the seismic data, the velocities are picked to honor the formation geological and structural boundaries defined by the lithological rock units and such features as faults and anomalous body boundaries in 2-D or 3-D.

The technique and computer software includes a method to isolate the velocities for geologic intervals that contain hydrocarbons or lithologies other than those that are appropriate to use in the prediction step. This same method can be used to isolate the velocities of reservoirs and seal rocks that are not in equilibrium with the encasing seal rocks. This method requires velocity types that have sufficient resolution to accurately detect the distinct velocities in these zones. In this situation, the software allows the user to identify the zone or zones to be excluded, and the software removes this value from the calculations in the prediction step.

The software also allows the data from anomalous zones to be saved to a separate data file that can be analyzed separately for pressures in specific zones.

The method can also be applied to pressure prediction from the results of seismic analysis on the geologic hazard called shallow water flows as defined in U.S. patent application Ser. No. 09/433,446 filed on Nov. 4, 1999 having the same assignee as the present application and the contents of which are fully incorporated herein by reference.

The method of excluding zones from the pressure analysis can be applied for any velocity data types that may be developed and used in other software that are already known to those versed in the art of pressure prediction.

The technique and software includes a method and means to change the overburden and fracture gradient calculated for a given location based on one of three schemes. In the first scheme, the analyst identifies an anomalous density zone that may be caused by the presence of either anomalous rocks or fluids, and inputs to the software the anomalous density value for that zone. The software inserts this new density for the interval into the overburden function for the location being evaluated, and re-calculates the overburden function using this zone in place of the densities from the reference function that was used originally to determine the overburden stress versus depth. This new function with the anomalous zone is used only at the location where the anomalous formation was identified. By doing this at each location where the anomalous zone is observed, the user may build an overburden and fracture gradient profile that honors the actual geology in 3 dimensions rather than relying on a 1D density function determined from a single well location that does not always represent the subsurface at other locations.

The second scheme for changing the overburden and fracture gradient is to use 2D or 3D density models determined independently from the inversion of vector and tensor gravity and vector and tensor magnetic data and to integrate these models in 2D or 3D to predict overburden in an area where pressures are to be predicted. This can include, but is not limited to the inclusion of 1D well density data for calibration of the gravity and magnetic data. Such methods of determination of overburden are discussed, for example, in U.S. patent application Ser. Nos. 09/285,570, 09/399,218, and 09/580,863.

The third scheme for changing the overburden and fracture gradient is to use density values predicted in 2D or 3D seismic data using simultaneous inversion of multicomponent PP and PS data or the density values predicted from pre-stack inversion. In this case, the seismic data is calibrated with density data from well control, and the 2D or 3D seismically derived density values are used at each location to calculate overburden and fracture gradient.

The technique and software contains a method and means for creating and applying calibration functions that are controlled by and keyed to specific geologic intervals in the subsurface. These are usually applied to a geologic interval of specific age that is observed to occur across a specific area of the subsurface and has a distinct pore pressure calibration that is different from intervals above and below it in the subsurface. The method and means allows the user to identify interpreted horizons to which the calibration is keyed and limits the application of the calibration to those horizons.

The method and means allows the user to use more than one active calibration at one time and the computer software splices these multiple calibrations together in the displays so that the user can simultaneously produce an integrated prediction for multiple zones with different calibrations. This multiple-zone calibration and prediction also includes the application of unloading parameters that can be specified for each calibration zone.

The technique and software includes interactive help menus that guide the interpreter through the process and method for performing pressure prediction. The help menu is divided into a methods tutorial and a hands-on help manual that defines and specifies what each module and function in the software actually does.

The technique and software includes a method and means of designing and applying a transformation function to data sets that are referenced to different map coordinate systems, including but not limited to UTM, shot point and line number, inline number and cross-line number, and state plane systems, such that all data can be referenced to a common coordinate system. Precise design and application of the transformations are facilitated by real-time parameter iteration made possible by concurrent examination of a base map display together with access to the transformation menu.

The technique and software includes a method and means of organizing data in a hierarchical structure. At each level of the hierarchy, one and only one set of data can be active. Within the active data set, multiple data elements can be selected for graphical and computational purposes.

The technique and software includes a method and means to automatically propagate the effects of interactive editing of calibration functions to those graphical displays that depend on the edited function. This capability includes but is not limited to real time updating of calculated effective stress, normal trend velocity, and pore pressure values in the calibration module in response to edits to the velocity versus effective stress calibration function, and updating the color underlay displays in the seismic section display in response to edits to parameters in the prediction module.

BRIEF DESCRIPTION OF THE DRAWINGS

The novel features that are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention:

FIG. 3 is a diagram illustrating the identification of shales at a well location.

FIG. 4b illustrates two different examples of calibration curves relating the density and porosity data of FIG. 4a.

FIG. 6 shows examples of plots of velocity and porosity as a function of depth along with calibration curves.

DETAILED DESCRIPTION OF THE INVENTION

Figure 1:
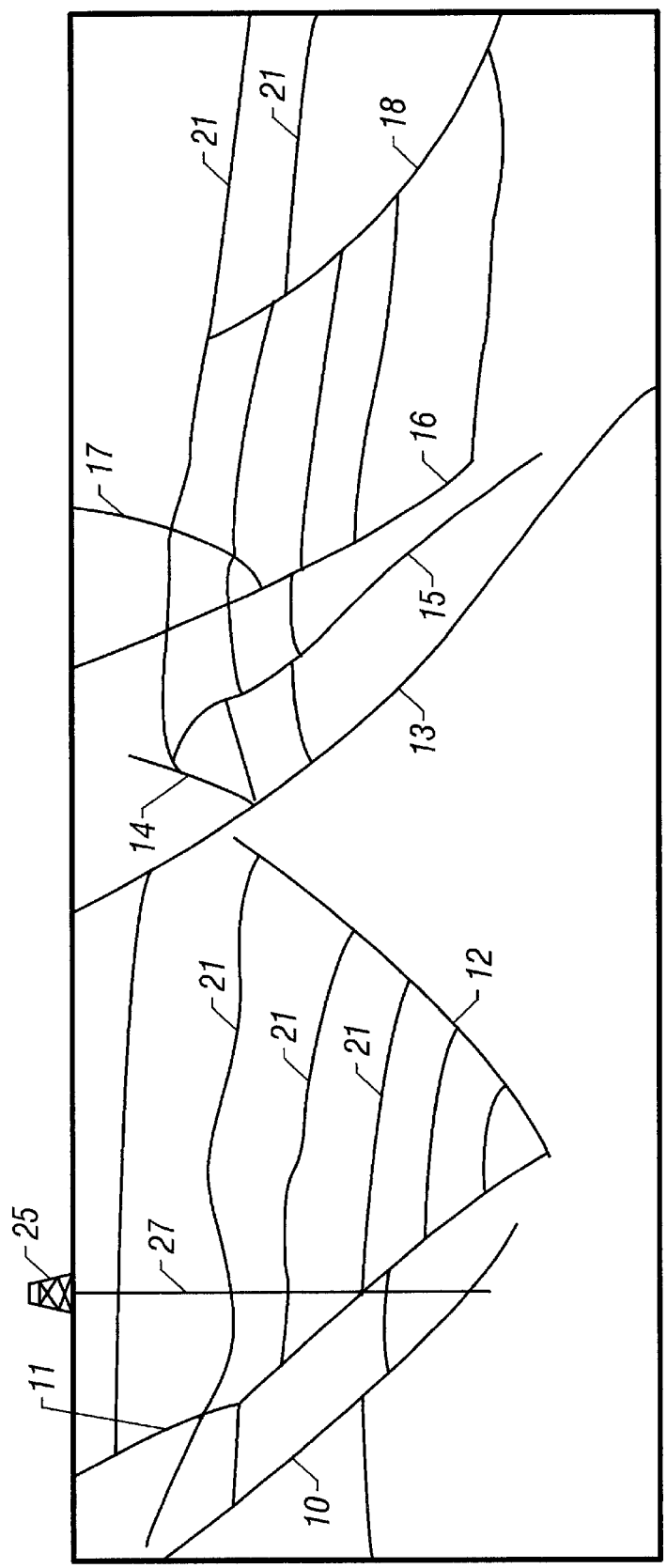
FIG. 1 is an illustration of a vertical section through the earth showing a well and geologic horizons including faults.

Referring now to FIG. 1, an example of a vertical section of subsurface region 1 is shown Indicated in the figure is a well location 25 with a well 27 penetrating the subsurface. A number of faults 10, 11, 12, 13, 14, 15, 16, 17, 18 are indicated in the figure as well as a number of horizons 21 that correspond to geologic intervals of interest.

In the well 27, a plurality of measurements may be made of the properties of the subsurface formations penetrated by the well. These typically include sonic logs that measure the velocity of compressional and shear velocities, density logs, gamma ray logs that are indicative of the shale content of the formation, and resistivity logs of various types that measure the formation resistivity.

In addition to these logs, a record is kept of the mud weight that is used for the drilling of the wellbore: as noted above, the mud weight is usually selected to maintain a slightly overbalanced condition wherein the borehole fluid pressure is slightly in excess of the formation fluid pressure. After the well is drilled, pressure drawdown and pressure buildup tests may be run at selected depths to make an accurate determination of the formation fluid pressure. These are indicative of the fluid pressures encountered in the well.

A line of 2-D seismic data (not shown) may be acquired over the region. Alternatively, a plurality of 2-D seismic lines or a set of 3-D seismic data may be acquired over the surface of the earth that includes the section shown in FIG. 1.

In one embodiment of the present invention, using the log information and/or seismic information in the vicinity of the well, a determination of the effective pressure in the formations and the overburden pressure on the formations is made. In another embodiment of the invention, the seismic data are used to obtain estimates of the effective stresses in the subsurface at locations away from the well. This may be done in the immediate vicinity of the well; on a prospect scale location (e.g. between the faults 11 and 12); or on a basin wide scale (e.g., extrapolating to another prospect such as the region between the faults 13 and 18.

In the present invention, the interpreter has a plurality of modules that perform different functions to enable this process of extrapolation away from the well. Depending upon the nature of the data available, different combinations of these modules may be used by the interpreter. Rather than providing an exhaustive list of the various combinations that may be used by the interpreter, the description herein first provides examples of the processes performed by the various modules and then gives examples of sequences that may be used.

Figure 2:
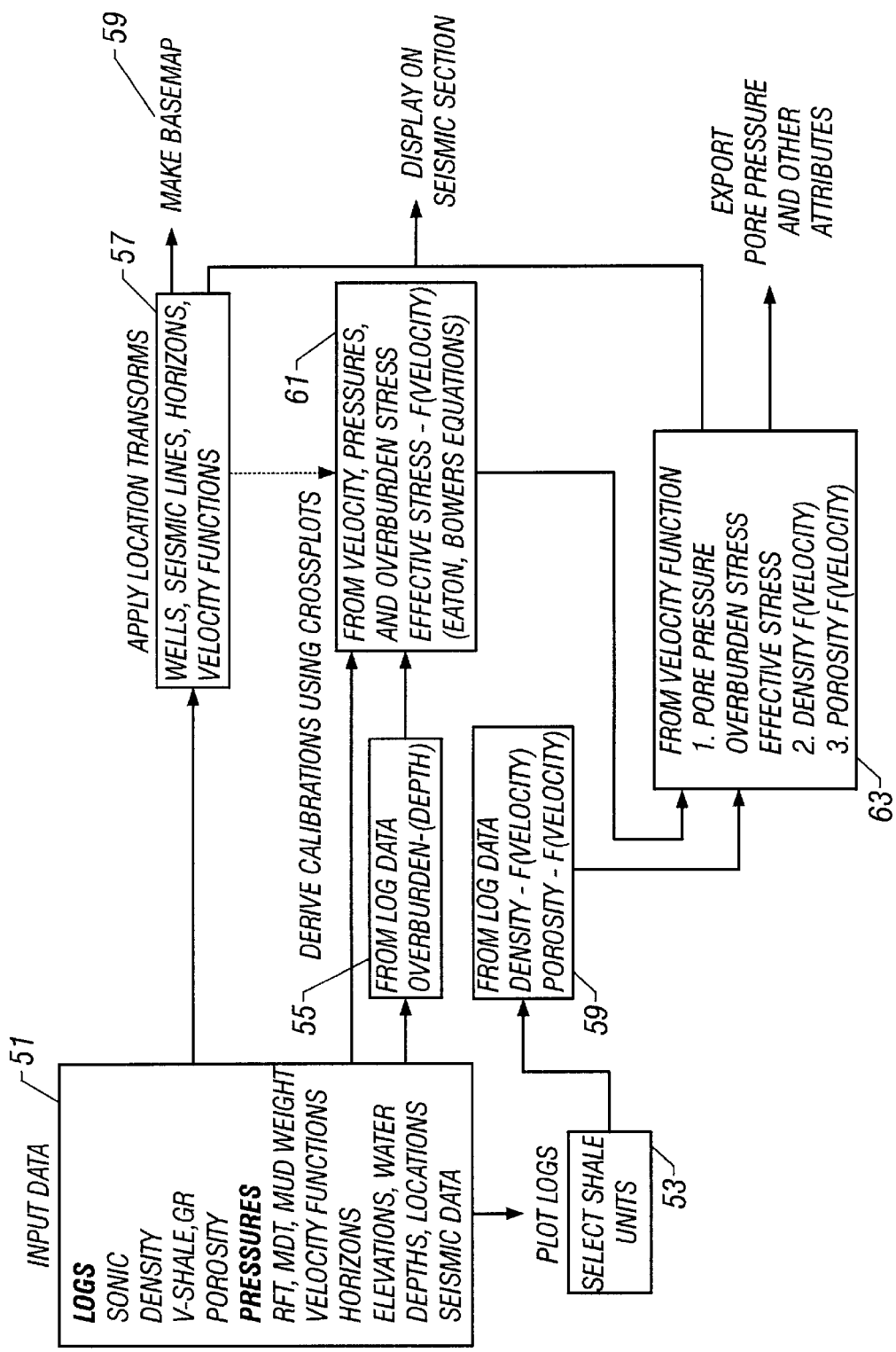
FIG. 2 is an example of a flow-stream using some of the modules of the present invention.

Turning now to FIG. 2, an overview of one method of using the present invention is illustrated. The input data 51 includes logs, pressure measurements at the well, velocity functions characterizing the propagation of seismic waves in the subsurface, seismic data, seismic horizons picked on the seismic data and surface elevations (for land seismic data) and water depth (for marine seismic data). These are described in more detail below.

The logs that may be used in the present invention include conventional sonic logs that measure the compressional velocity of elastic waves in the formation. These would be known to those versed in the art and are not described further. In addition to conventional sonic logs, an embodiment of the present invention also uses measurements of shear velocities in the formation. These may be direct measurements of shear velocities using devices such as a dipole logging tool. U.S. Pat. No. 4,606,014 to Winbow et al. gives an example of a dipole sonic logging tool. Other examples of dipole logging tools are described in U.S. Pat. No. 4,703,460 to Kukjian et al., U.S. Pat. No. 4,862,991 to Hoyle et al. and are not discussed further. Alternatively, direct measurements of shear velocities may also be obtained using a quadrupole or octupole logging device. Such devices are described in U.S. Pat. No. 4,855,963 to Winbow et al. and U.S. Pat. No. 4,951,267 to Chang et al. and are not discussed further.

Shear velocity measurements of the formation may also be obtained by indirect methods. For example, U.S. Pat. No. 4,774,693 to Winbow et al teaches a method for determination of shear velocities using guided waves produced in a borehole by a logging tool. In the present invention, shear velocities obtained by any direct or indirect method may be used.

Shear velocities are an important indicator of the effective stress of a fluid filled rock. U.S. patent application Ser. No. 09/433,446 of Huffman having the same assignee as the present application and the contents of which are fully incorporated herein by reference teaches the relation between effective stress and the shear velocity of clastic sediments. An optional embodiment of the present invention uses this relationship to obtain an estimate of effective stress from shear velocity measurements.

Density logs may also be used in the present invention. They may be used to obtain an estimate of the compressional velocity using the Gardner-Gardner-Gregory GGG) relation $$\rho = 0.23 \, V^{0.25} \tag{6}$$

where $\rho$ is the density in gm/cm$^3$ and V is the compressional wave velocity in ft/s. An optional embodiment of the present invention uses a general power law relationship in which the exponent and the constant of proportionality may be determined from a combination of density logs and sonic logs.

The density logs may also be used in the determination of the overburden stress as described below.

Logs indicative of the shale content of the formations (such as gamma ray logs) may also be part of the input to the present invention. As described below, portions of the sonic logs corresponding to shaly intervals may be used as part of the calibration process. In a preferred embodiment of the invention, the shale-prone intervals are selected preferentially and are used to define a shale compaction trend in the calibration process.

Mud weight measurements may also be recorded and used along with Repeat Formation Tester (RFT) and Modular Dynamic Tester (MDT) for estimates of the formation fluid pressure. The MDT is the new Schlumberger tool that does the same thing as the RFT tool, but also has several new features including (1) a sensor in the device that tests fluid resistivity to make sure that the formation fluid being gathered is pristine formation fluid, (2) a larger set of sample chambers for gathering fluid, and (3) a pump that actually draws fluid out of the formation rather than relying on ambient flow to fill the chambers. (Probably more than you wanted to know)

The use of velocity information from seismic data has been described in prior art. However, the use of such velocity information in prior art is limited to conventional coherency spectra of gathers of common-midpoint (CMP) data. In the present invention, a novel aspect is the use of such conventional coherency spectra in conjunction with picked horizons of the seismic data. This is illustrated below and discussed with reference to FIG. 16. In addition, alternative embodiments of the present invention use other methods for determination of velocities of seismic waves in the subsurface. Specifically, in land seismic prospecting, shear seismic data may be used and velocity spectra derived therefrom. In addition, in marine seismic prospecting, a combination of compressional and converted wave seismic data may be used for determination of compressional and shear velocities. The use of converted wave prospecting for velocity determination is discussed, for example, in U.S. Pat. No. 4,881,209 to Bloomquist et al., U.S. Pat. No. 6,128,580 to Thomsen and is not discussed further here.

Alternative embodiments of the present invention use velocities derived from prestack inversion of compressional wave data, post-stack inversion of compressional wave data, prestack and post-stack inversion of shear seismic data, joint inversion of compressional and converted wave seismic data and joint inversion of compressional and shear seismic data. An example of prestack inversion of compressional wave seismic data is given in U.S. Pat. No. 5,583,825 to Carrazonne et al. the contents of which are incorporated herein by reference. Other examples of velocity determination using inversion techniques are given in Savic et al., Mallick et al., Connolly, and Duffaut et al.

Post-stack inversion is one alternative to conventional velocity analysis that provides higher resolution by inverting for impedance from the reflection strength. Post-stack inversion allows the analyst to separate the seismic wavelet from the reflection series represented by the geologic formations, and results in an estimate of residual impedance for each layer. Post-stack inversion can be applied using only the stacked seismic data, or can be calibrated with well logs, check shot surveys, VSP data and seismic velocity data. When calibrated properly with low frequency velocity field data, the analysis can be used to generate an estimate of the absolute impedance, or its components of velocity and density. This requires a good set of density-velocity relationships for the lithologies encountered in the wells, so that these two components can be separated effectively. This exercise is not trivial, however, because the post-stack inversion technique ignores the fact that offset-dependent behavior (AVO) is buried in the stacked response and can cause significant perturbation of the results. One way to overcome this limitation and also boost resolution of the results at the same time is to use only the near offset traces for the analysis. This is a good method to use as it provides higher resolution results due to the removal of far-offset data that are degraded by NMO stretch. Near-stack inversion also gives the most robust calibration to well logs that are essentially measuring the same vertical-incident information.

In an optional embodiment of the present invention, pre-stack inversion of seismic data provides a higher level of accuracy and allows prediction of pressure at a scale that was not achievable in the past. Pre-stack inversion can estimate the P wave velocity, shear wave velocity, and density simultaneously by using the near-offset reflectivity and amplitude versus offset behavior of each reflection in the subsurface. This allows the interpreter to estimate the overburden and effective stress from the same data set. The resolution limits for pre-stack inversion are approximately at the tuning thickness of the individual formations, so that pressure data can be generated for layers on the order of 100–200 feet thick at moderate depths in clastic basins. The biggest drawback to pre-stack inversion at this time other than cost is its extreme sensitivity to data quality. A robust inversion requires data that are relatively clean, uncontaminated by multiples and noise, and in areas of little structural complexity. In addition, the resolution and accuracy of pre-stack inversion is only as good as the quality of the reflection events in the data. If there are pressure cells that do not have reflections associated with them, no velocity or reflection-amplitude technique including inversion will identify those zones.

The use of calibrated pre-stack inversion, especially where multicomponent data are available, allows the estimation of density and velocity simultaneously along a line. This makes possible predictions that take into account the lateral variations in density that accompany changes in pressure. At present, most methods of pressure prediction assume that the overburden from the control well represents overburden globally, which is false in general. Pre-stack inversion helps to remedy this problem by predicting the density from the seismic data and allowing the pressure interpreter to make judgements about the density using the seismic and well data and his own intuition.

Pre-stack inversion makes possible isolation of velocities for individual sand packages so that the interpreter can determine where disequilibrium may exist between the sand-bearing formations and massive shales, and to isolate the velocity and density effect of hydrocarbon-bearing reservoirs on the velocity field around them. At present, most methods lump these effects into thicker stratigraphic intervals that have a single velocity attached to them and hide the effect. These errors can cause predictions to overestimate or underestimate pressures significantly which leads to less effective well planning.

Velocity information for the present invention may also be obtained using cross-well tomography. This is generally has poorer resolution in a horizontal direction but may have higher resolution in a vertical direction than analysis of velocity spectra of surface seismic data. Depending upon the type of sources and detectors used, compressional and/or shear velocities may be obtained. Such tomographic methods would be known to those versed in the art and are not discussed further.

Velocity information in a limited region in the vicinity of a wellbore may also be obtained using Vertical Seismic Profiling (VSP). These may be for P-wave velocities or for S-wave velocities and may be either in a conventional VSP or in a look-ahead mode wherein velocities are obtained pertaining to formations ahead of a drilled well. Such methods would be known to those versed in the art and are not discussed further.

Returning now to FIG. 2, one of the steps that may be used in calibration is to identify the shale formations in the well 53. The reason for this is that clay and shale tend to show the effects of compaction better than sand. FIG. 3 shows an example of the identification of the shales in the subsurface. The left panel 101 shows a sonic log 111, the center panel 103 shows an example of a porosity log 113 and the right panel 105 shows an example of a gamma ray log 115. The porosity log 113 is obtained external to the present invention from the density log. The density porosity is preferable to a neutron porosity. The gamma ray log 115 is a good indicator of shaliness in clastic sediments because shales have a higher potassium content than sands as a result of which shales have a higher ganmna ray count. Indicated in the right panel 105 is a shale line 117 that may be determined interactively by the user of the invention. In a preferred embodiment of the invention, the shale line may be represented by a piecewise linear function. Only velocity and porosity samples that correspond to depths where the gamma ray count is to the right of the shale line 117 are used in the calibration process. An optional plot in the present invention (not shown) provides the interpreter with a color display of the selected and deselected portions of the various logs.

Figure 4A:
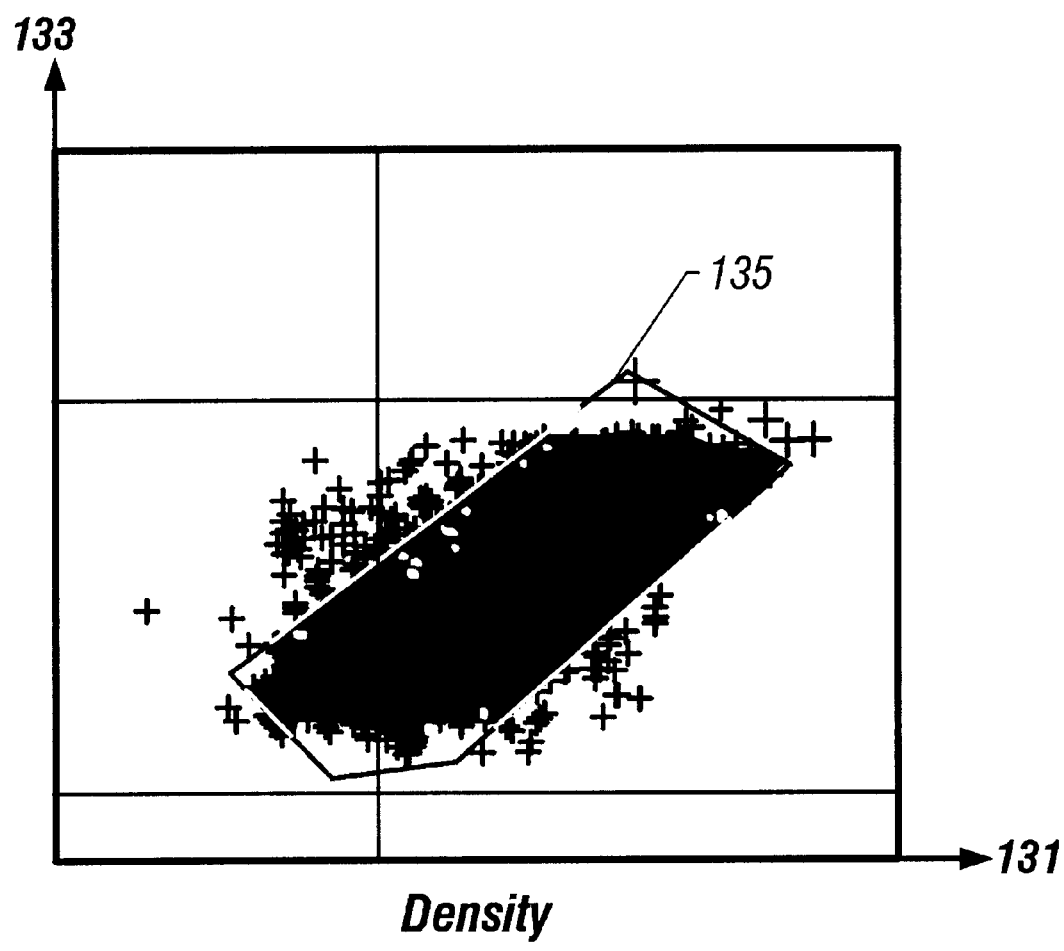
FIG. 4a is an example of a- cross-plot of density and porosity

A useful aspect of the present invention is the ability to cross-plot different properties. An example of this is shown in FIG. 4a that is a cross-plot of density along the abscissa 131 and porosity as the ordinate 133. The present invention provides the user with the ability to interactively edit the data by drawing a polygon such as 135 enabling the selection of points within the polygon and deselecting points outside the polygon. As with other displays, the selected and deselected points appear in different colors.

Figure 4B:
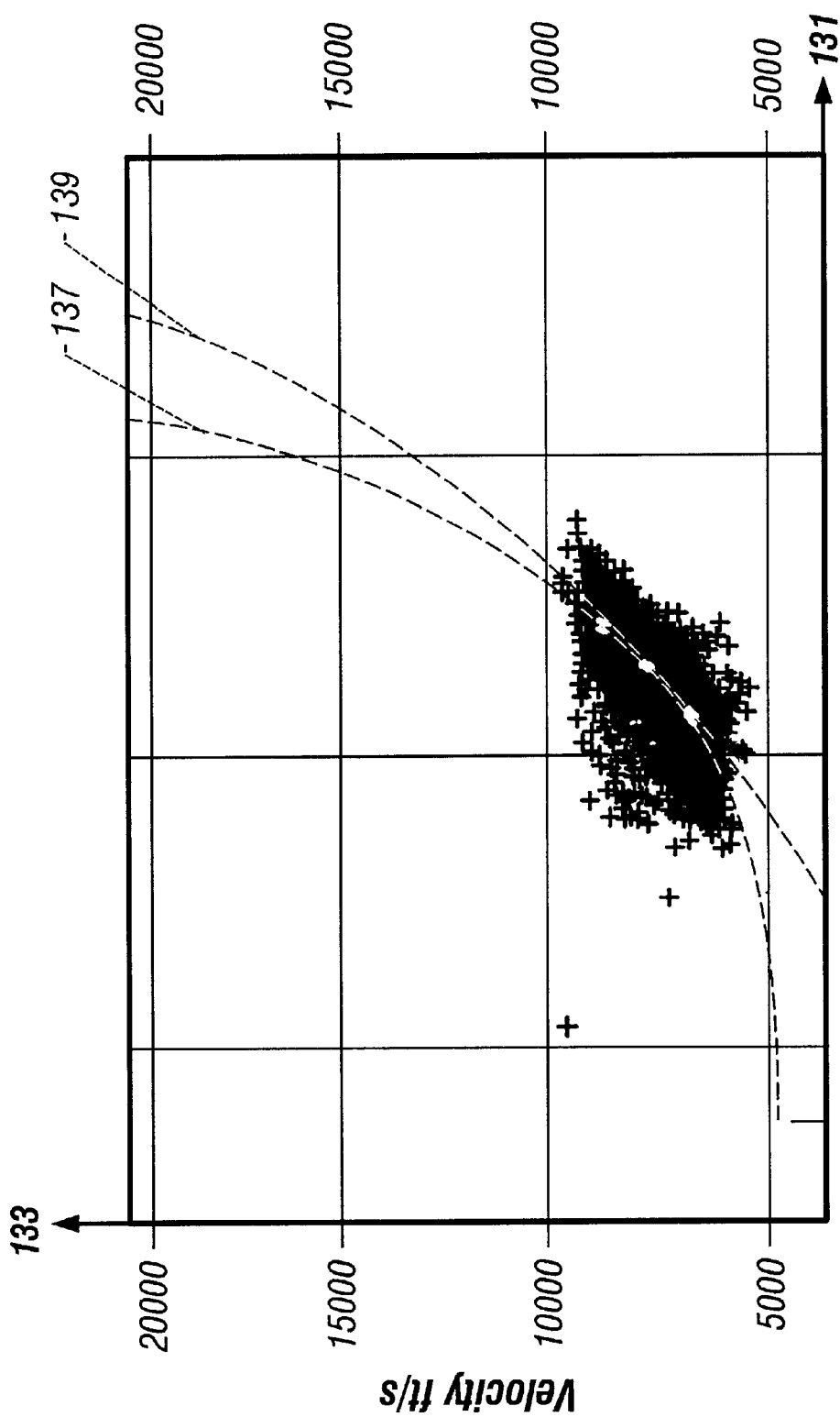

FIG. 4b shows the data of FIG. 4a with two different curves 137 and 139 superposed thereon. In the example of FIG. 4b, the curve 137 corresponds to the GGG relation whereas the curve 139 is a different fit determined interactively by the interpreter. The interpreter has a variety of fits available, including power laws, exponentials and polynomials. One of the useful aspects of the present invention is that in the interactive displays, an active curve or data points appear in one color (e.g., green) and the results of user interaction appear in a second color (e.g., red). This enables the interpreter to easily compare the current iteration with what may have been determined earlier. Different curves may be derived in different regions of the plot.

Cross-plots and calibrations such as shown in FIGS. 4a–4b are also indicated at 59 in FIG. 2: different calibrations may be derived by the interpreter for the density-velocity relation and the porosity-velocity relation.

Figure 5B:
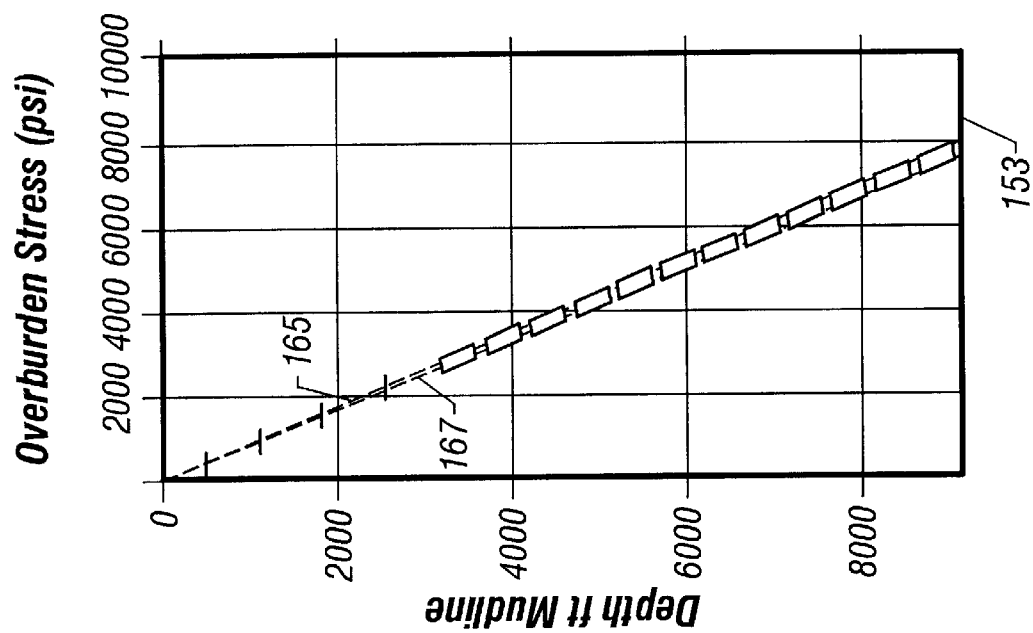
FIG. 5 shows an example of overburden stress determination that is useful in calibration.
Figure 5A:
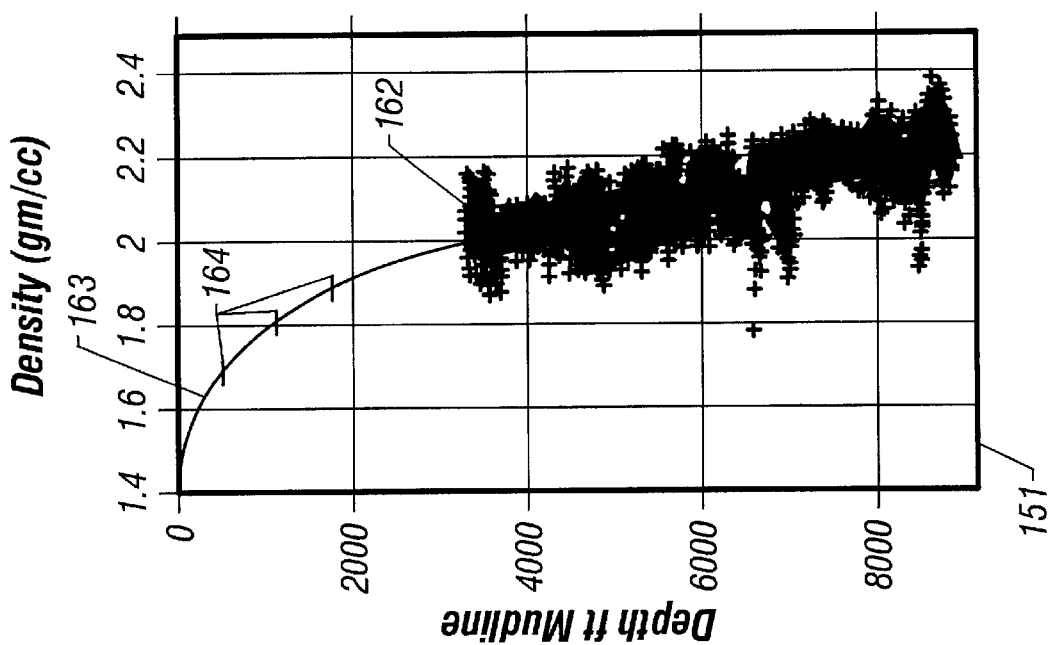

Still referring to FIG. 2, the present invention provides the interpreter with the ability to determine the overburden stress 55. This is illustrated in FIG. 5. Two panels of data are shown. The right panel 151 is a plot of density (abscissa) vs. the depth 161 (ordinate). The density values from the density log are shown 162: these may or may not have been preselected as described above. Also shown is an example of a power law curve 163 that starts with a density of 1.4 at the ocean bottom. Additional points 164 may be added by the interpreter.

Shown in the right panel 153 is the determined overburden stress. Two curves are shown: 167 corresponds to the curve density-depth values shown in the left panel 151 while the curve 165 corresponds to a uniform density of 2.0 above the top of the log. As in other displays, the interpreter has the capability of changing the parameters of the curve fit and immediately seeing the effect this has on the determined overburden stress.

Another display that is important is shown in FIG. 6. The right panel 203 is a cross-plot of density against velocity. This is the same data that is in FIG. 4b; however, two types of symbols are used in the plot. The light colored symbols are for the shale samples selected in FIG. 3 while the dark symbols are used to plot the remaining values from the logs of FIG. 3. The left panel 201 is a cross-plot of velocity against porosity, with all the data points shown. Also shown in the right panel 203 are two different curve fits to the data: the curve 205 corresponds to a density constrained to be 1.4 at the ocean bottom (velocity=5000 ft/s) while the curve 207 is an unconstrained fit.

Figure 7C:
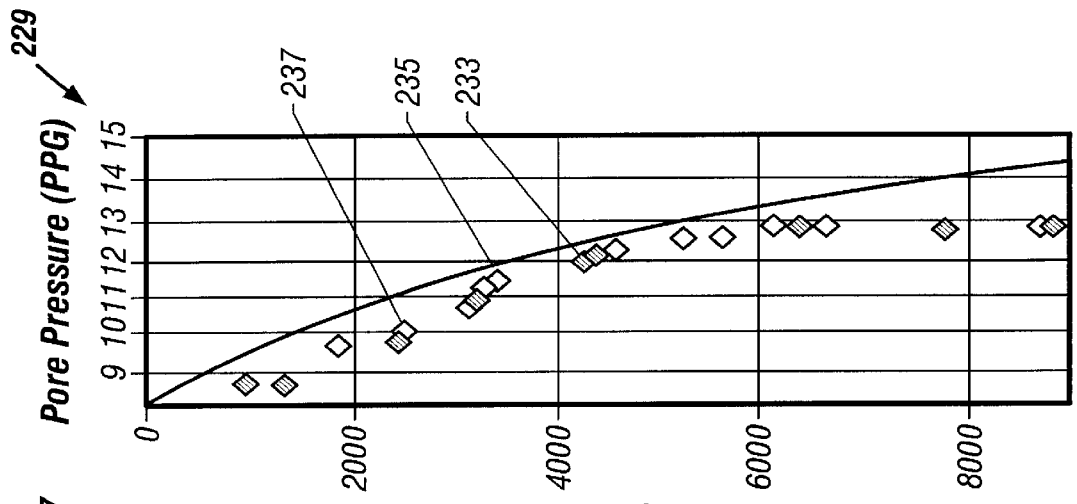
FIG. 7 shows plots of velocity, effective stress and pore pressure gradient.
Figure 7B:
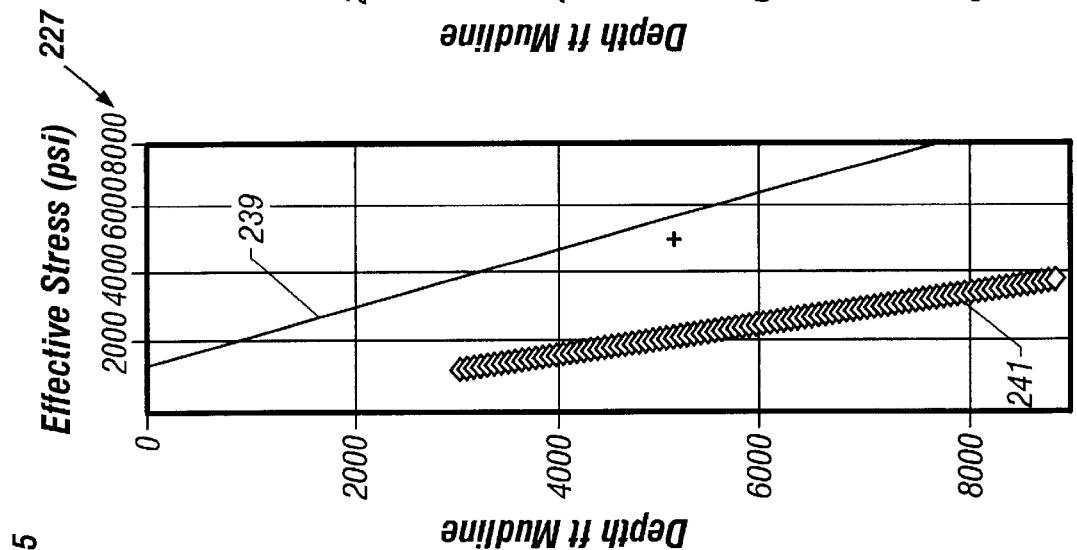
Figure 7A:
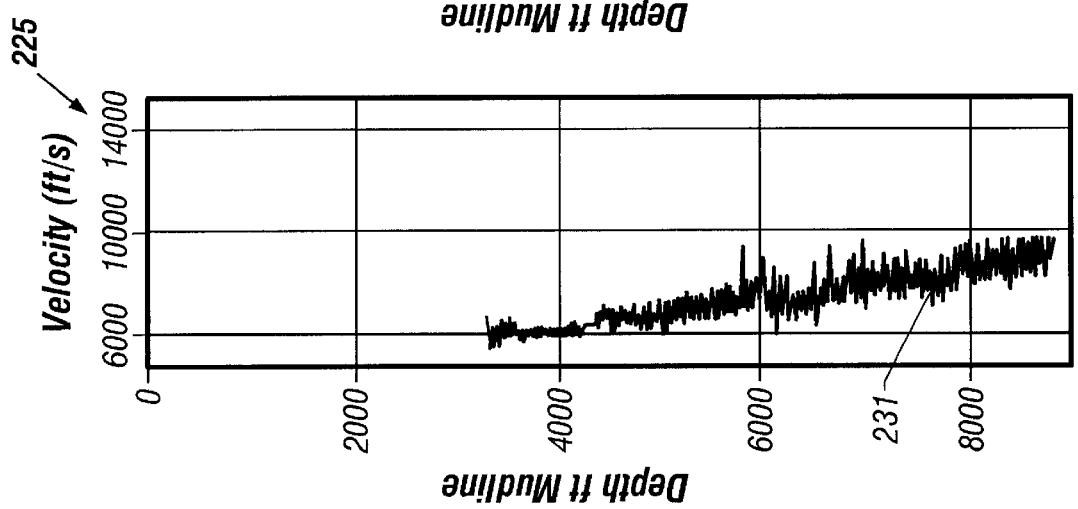

Turning now to FIG. 7, another display that is useful in performing the calibration is shown. The left panel 225 is a plot of the velocity log 231. In the actual screen display, the shales and the non-shales would appear in different colors. The right panel 229 is a plot of the overburden stress 233 on a pore-pressure gradient (PPG) scale. Also displayed in the right panel are mud weight data from the scout data and the mud log 235, 237. The center panel 227 on a scale of stress shows the overburden stress 239 and the effective stress 241. The effective stress is based on an assumption that the fluid pressure is hydrostatic. The difference in the appearance of the overburden stress in the center 227 and the right panel 229 is because 227 is in pressure and 229 is in pressure gradient units. The reason the effective stress appears as a fat line is that it comprises diamond shaped plot symbols every 50 ft.

Figure 8A:
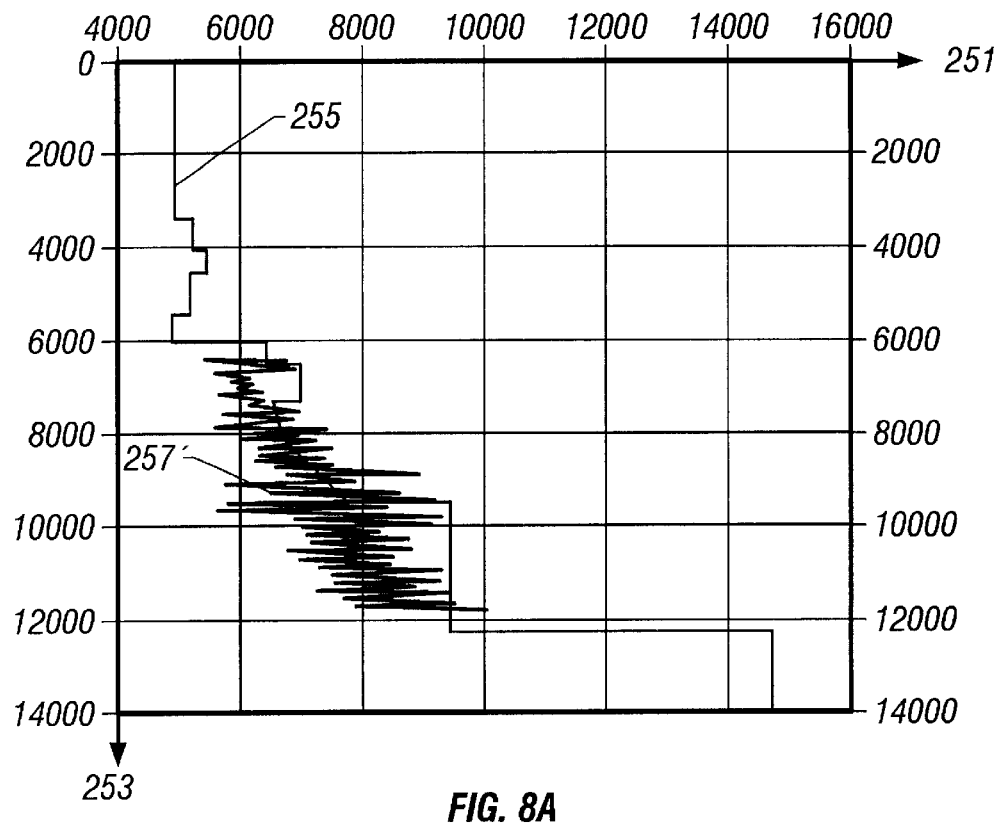
FIG. 8a is a plot showing a comparison of seismically derived interval velocities and log velocities.
Figure 8B:
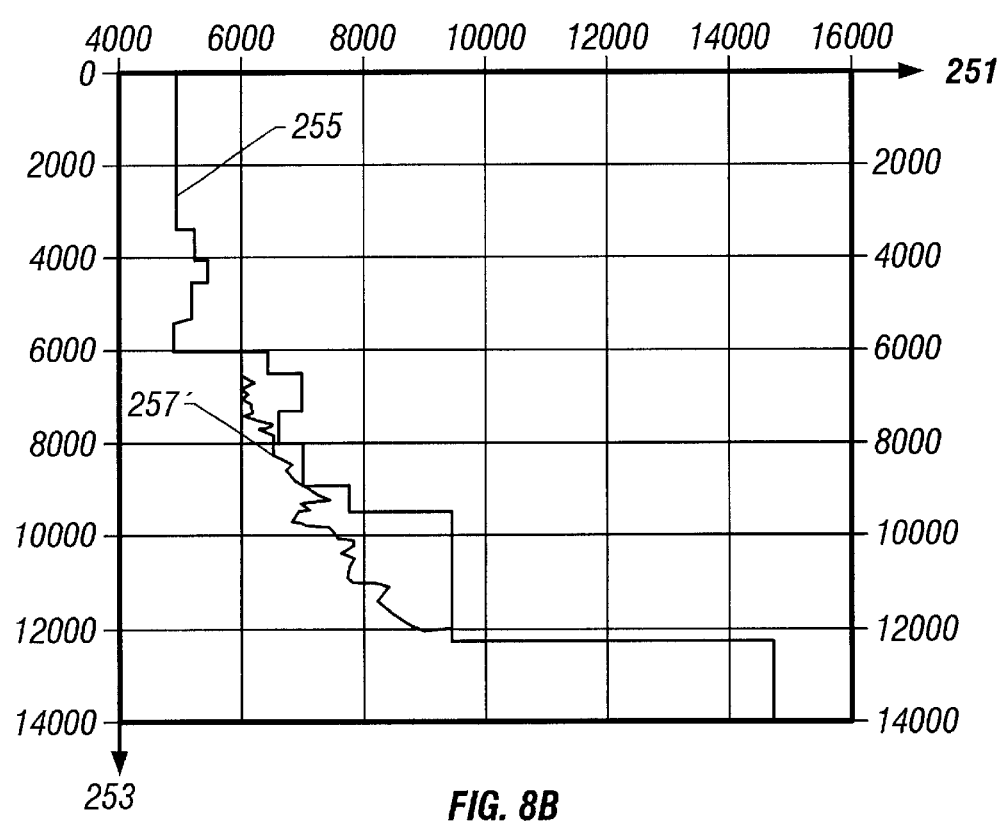
FIG. 8b is a plot showing a comparison of seismically derived interval velocities and filtered log velocities.

Those versed in the art would recognize that sonic log velocities do not necessarily agree with seismically determined velocities in the immediate vicinity of the well. This is brought out in FIGS. 8a and 8b. FIG. 8a is a plot of the seismically derived interval velocity 255 and the sonic log velocity 257. The abscissa 251 is the velocity and the ordinate 253 is depth. FIG. 8b is similar to FIG. 8a except that the sonic log displayed is a filtered log 257'. They clearly show that the seismic velocities are higher than the sonic logs.

Figure 9:
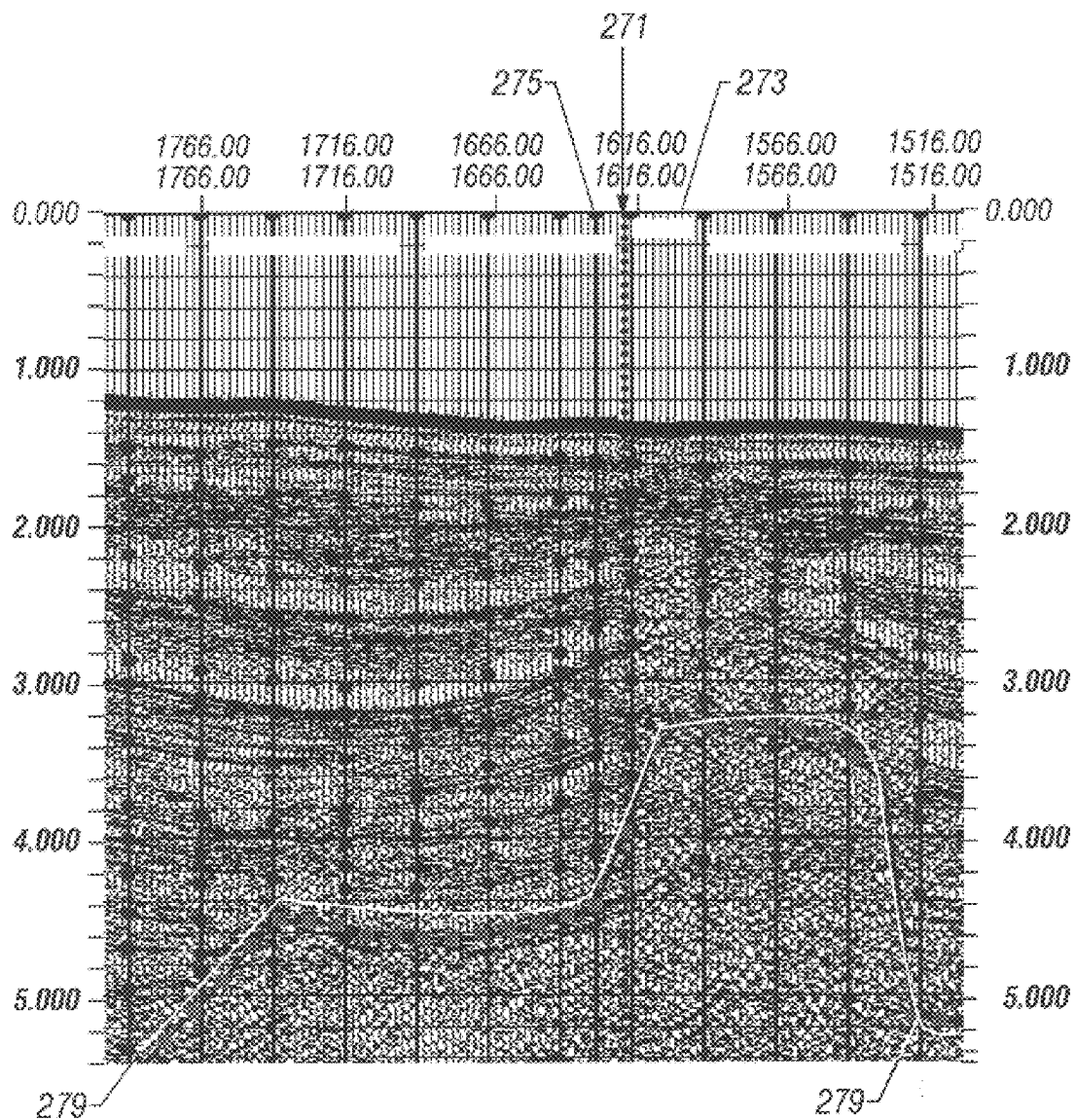
FIG. 9 is a display showing seismic data and locations where seismic velocities have been derived.
Figure 10:
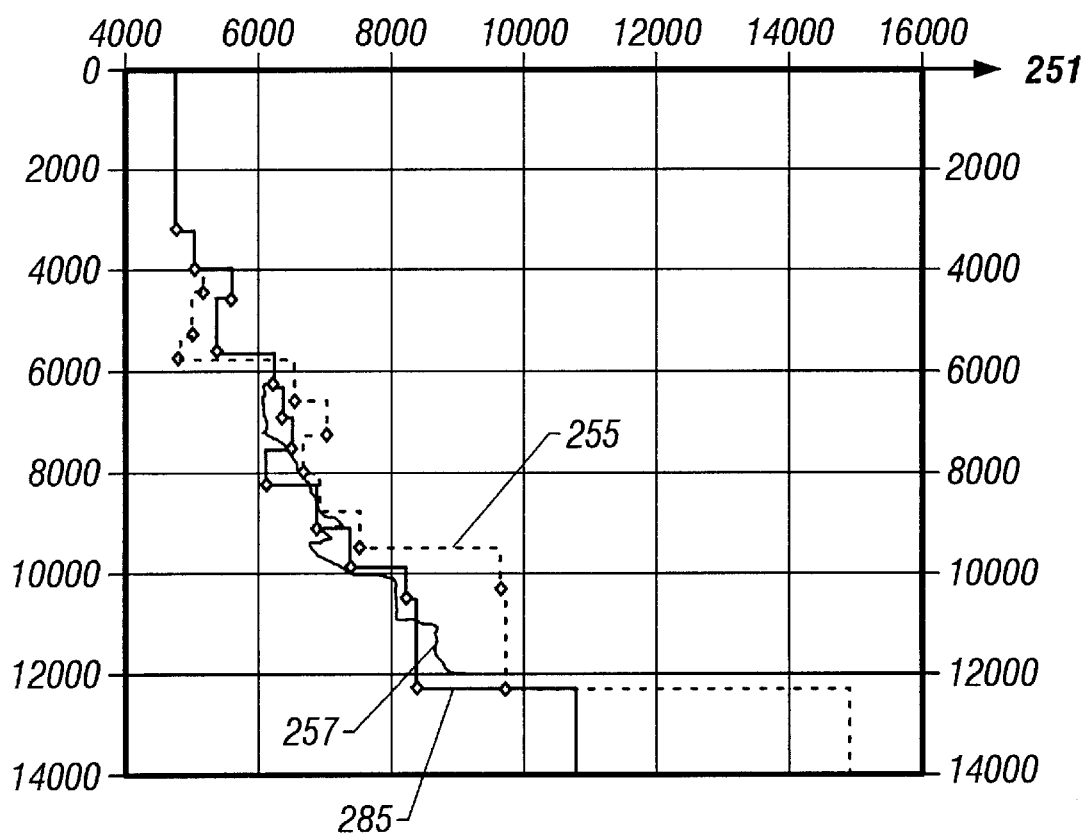
FIG. 10 is a display of seismically derived interval velocities at two different locations along with a filtered velocity log from a well.

The reason for this discrepancy becomes clear upon examination of FIG. 9 which is a display of the seismic section with the well location 271 indicated, along with the location 273 where the velocity used in the display of FIGS. 8a, 8b was derived. The well is seen to be on a flank of a salt dome 279 with steeply dipping sediments on its flanks. In addition to the dips, the shallow seismic data at location 273 is noisy, possibly due to gas leakage from a reservoir. FIG. 10 shows a display of the filtered sonic log 257' along with the seismic velocity 255 at location 273 and the seismic velocity 285 from a location 275 in FIG. 9 away from the salt dome. The velocity function 285 is in good agreement with the filtered sonic log 257'.

Figure 11:
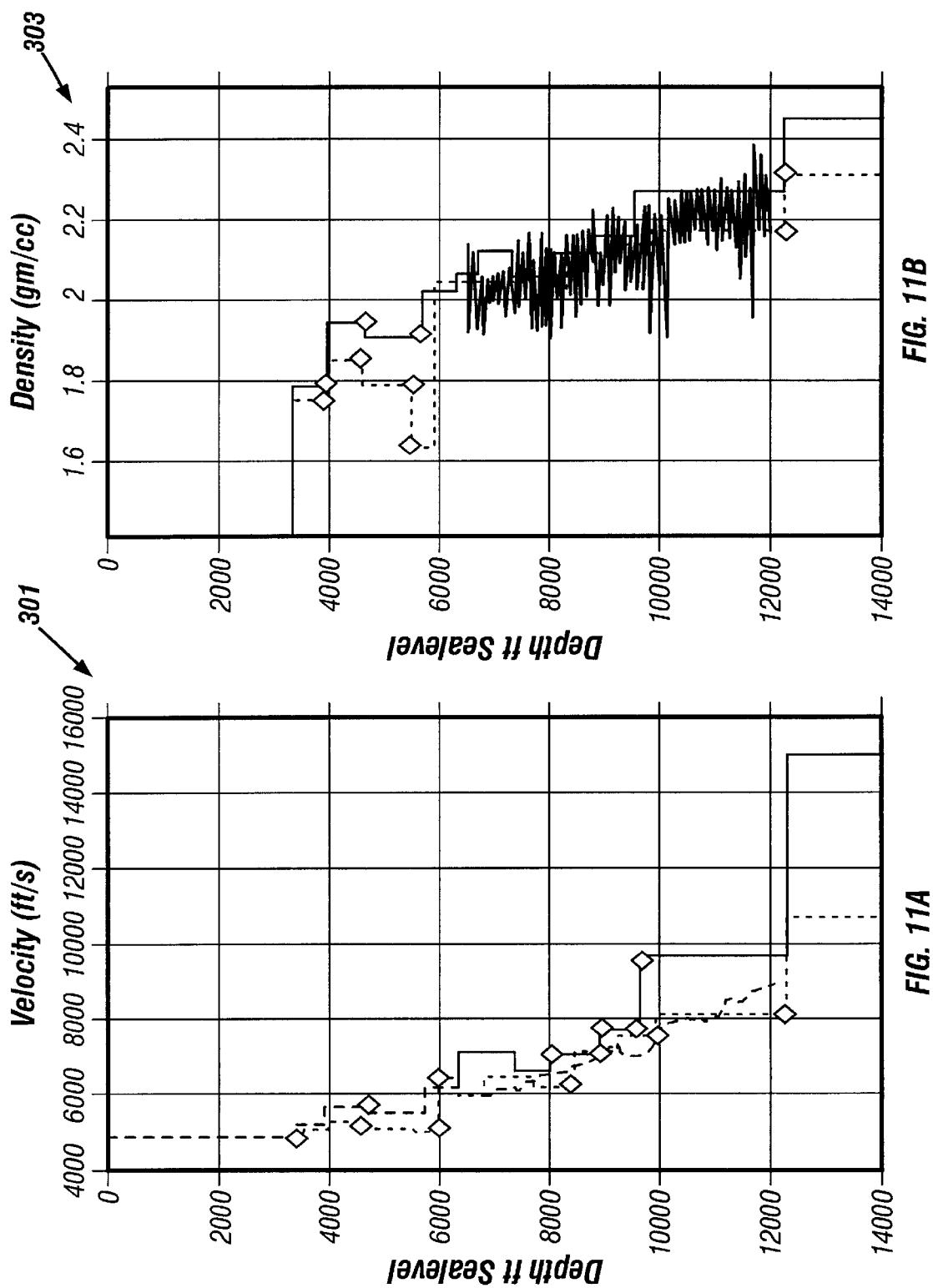
FIG. 11 shows a comparison of densities derived from seismic velocities and a density log.

Another useful display in the calibration process is a comparison of densities derived from seismic velocities with the density log at the well. This is shown in FIG. 11 where the left panel 301 is identical to FIG. 10 and the right panel shows the density log 305 at the well, and density functions 307 and 309 derived from the seismic velocities at locations 273 and 271 in FIG. 9 respectively. The density function is derived from a density-velocity calibration such as curves 205 or 207 in FIG. 6. A similar plot may be made (not shown) of seismically derived porosities and well porosities.

In the present invention, a useful check of the calibration process is to compare seismically derived velocities, densities and porosities with log data from another well if such a well is available. Such a comparison serves as an indication of how far from a calibration well the seismic data may be used for prediction of formation properties. If such a comparison is good over certain geologic intervals but not over other geologic intervals, this enables the interpreter to use a different calibration for different regions of the subsurface region 1 in FIG. 1.

Figure 12:
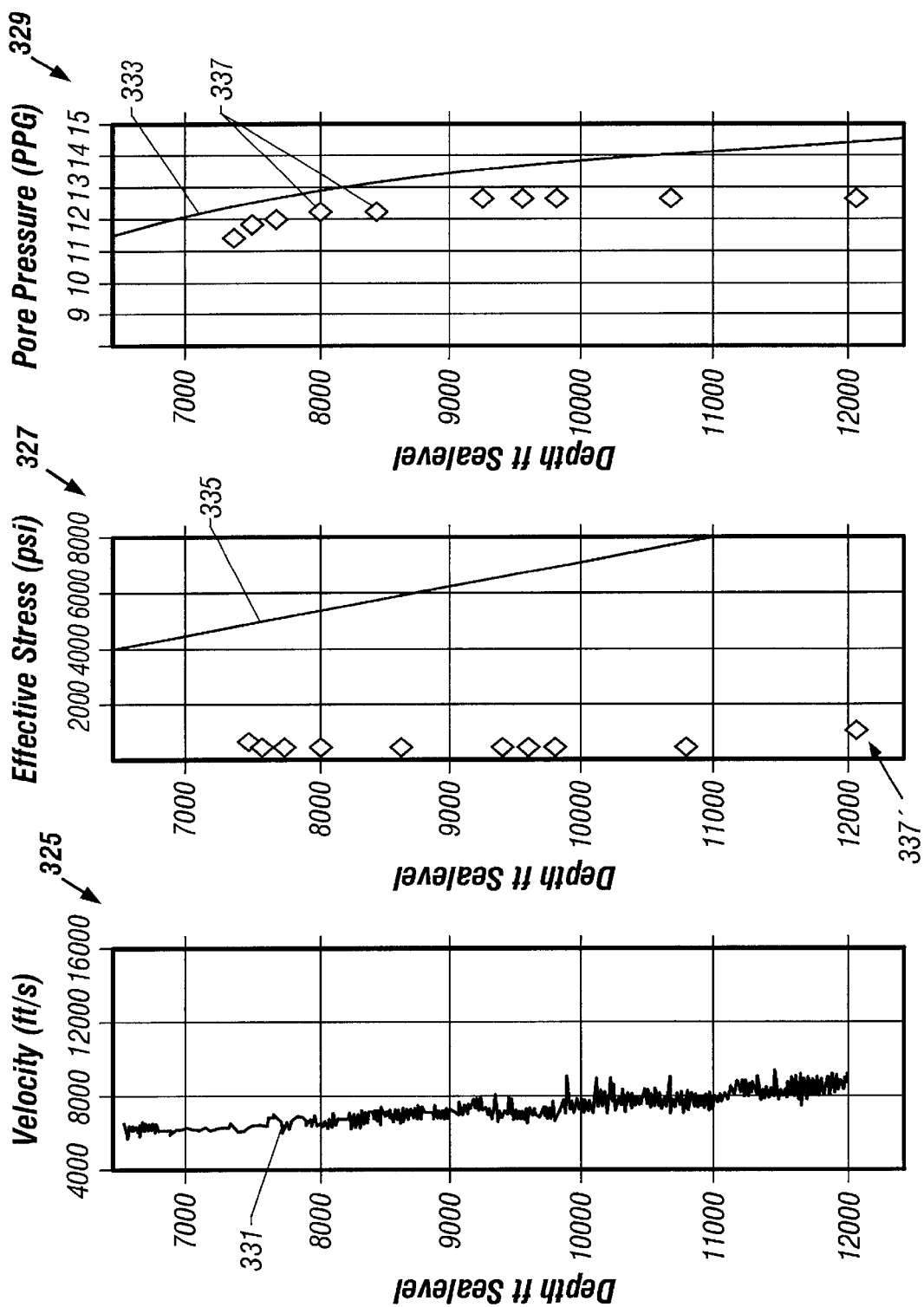
FIG. 12 shows sonic log velocities, effective stresses in the formation and pore pressure data from mud weights.
Figure 13:
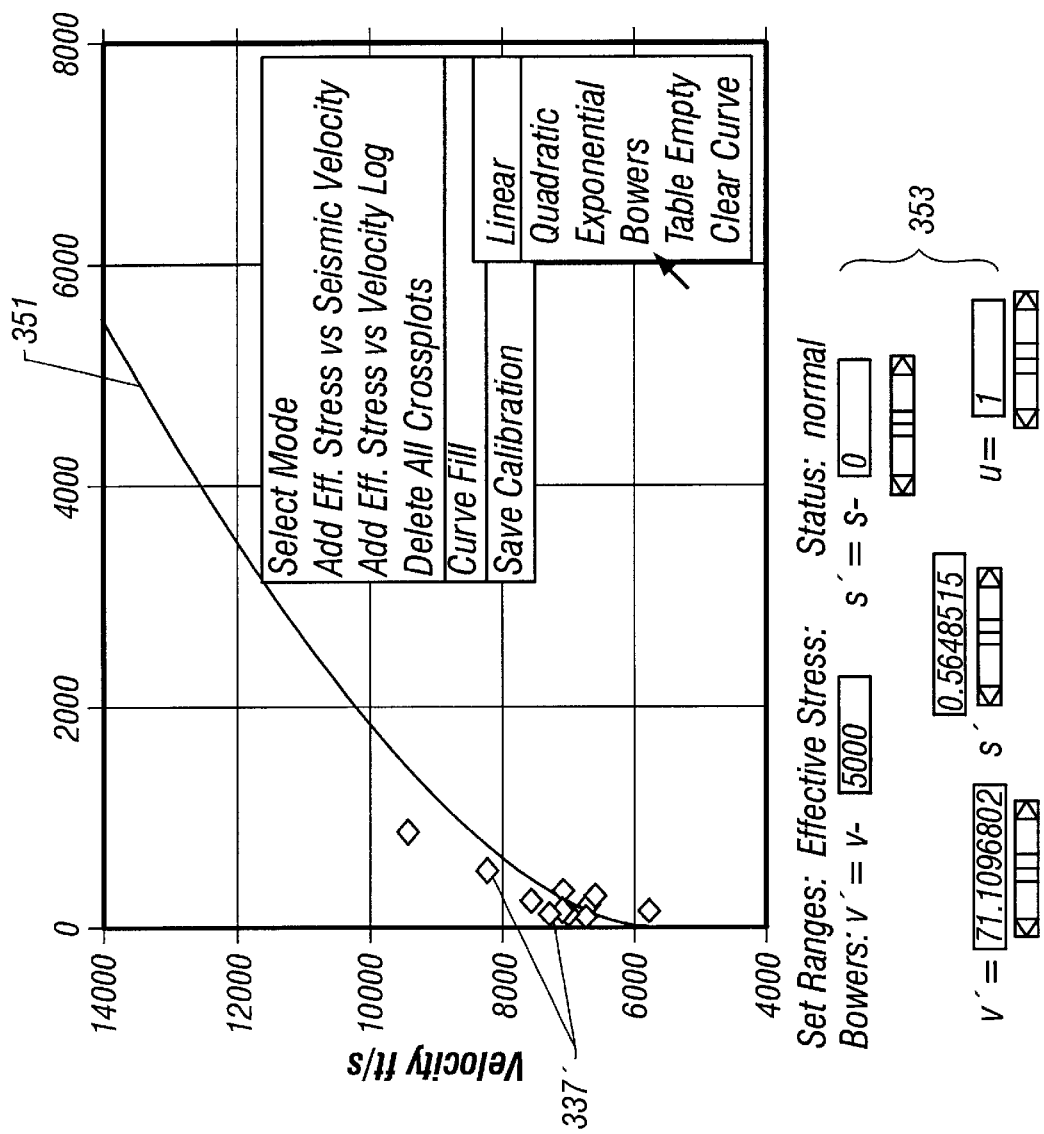
FIG. 13 shows an example of a calibration of sonic velocity and effective stress using a Bowers curve fit.

FIG. 12 is a plot similar to FIG. 7. The left panel 325 shows the sonic log 331 as a function of depth. The right panel 329 is a display on a pressure gradient (mud weight) scale of the overburden pressure gradient 333 and the mud weight observations at specific depths 337. The center panel is a display on a stress scale of the overburden stress 335 and the effective stress 337' corresponding to the observed mud weights 337. Using the data from the middle panel 327 a display of the effective stress calibration may be obtained as shown in FIG. 13. Shown in FIG. 13 is a plot of the sonic velocity as a function of the effective stress. The velocity data points corresponding to the mud weight observations 337' are plotted as the points 337". The horizontal scale is a stress scale and a fit curve 351 is indicated on the display. As indicated in the figure, the interpreter has control over the type of curve fit (linear, quadratic, exponential or Bowers) 353 and the parameters of the fit are shown on the screen display.

Figure 14:
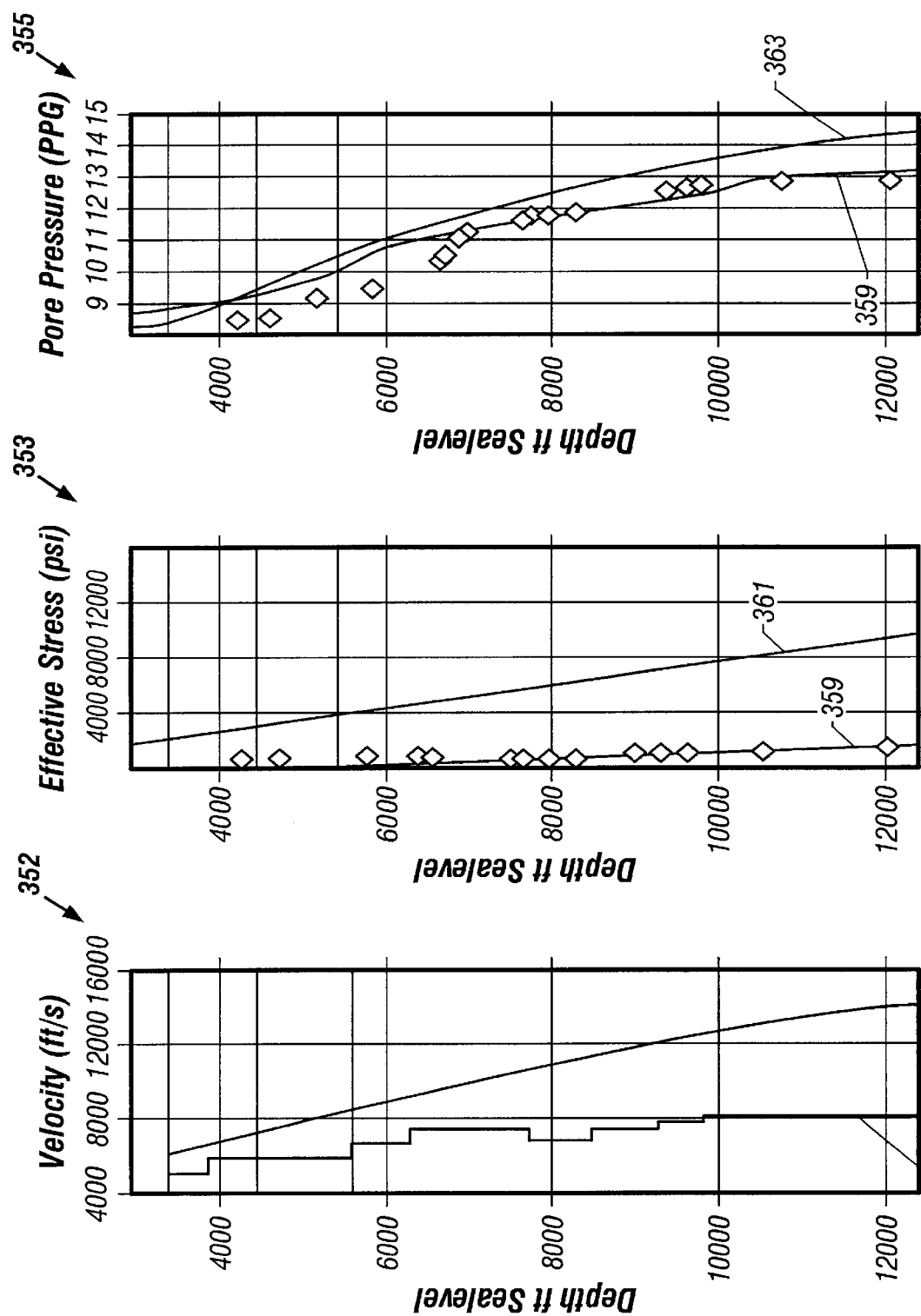
FIG. 14 shows effective stresses derived from seismic velocities using the calibration of FIG. 13.

Using the results of the calibration curve 351 in FIG. 13, seismically derived velocities such as those shown in panel 301 of FIG. 11 may be used to estimate the effective stress. This is shown in FIG. 14 where the left panel 352 shows the seismically derived velocities 357 near the well location and the calibration curve for normal pressure, the center panel 353 shows the estimated effective stress curve 359 along with a display of the overburden stress calibration 361. The right panel 355 shows, on a pore pressure gradient scale, the estimated pore pressure curve 359' along with the overburden stress gradient 363. As can be seen in FIG. 13, the effective stress is well below what would be expected under hydrostatic conditions, indicating that the entire interval is overpressured. A display similar to FIG. 14 but not shown here may be used to shown a comparison between the effective stress expected on the basis of the sonic logs with the expected stress under normally-pressured conditions: such a comparison may be used prior to the prediction of effective stresses from seismically derived velocities shown in FIG. 14.

Figure 15:
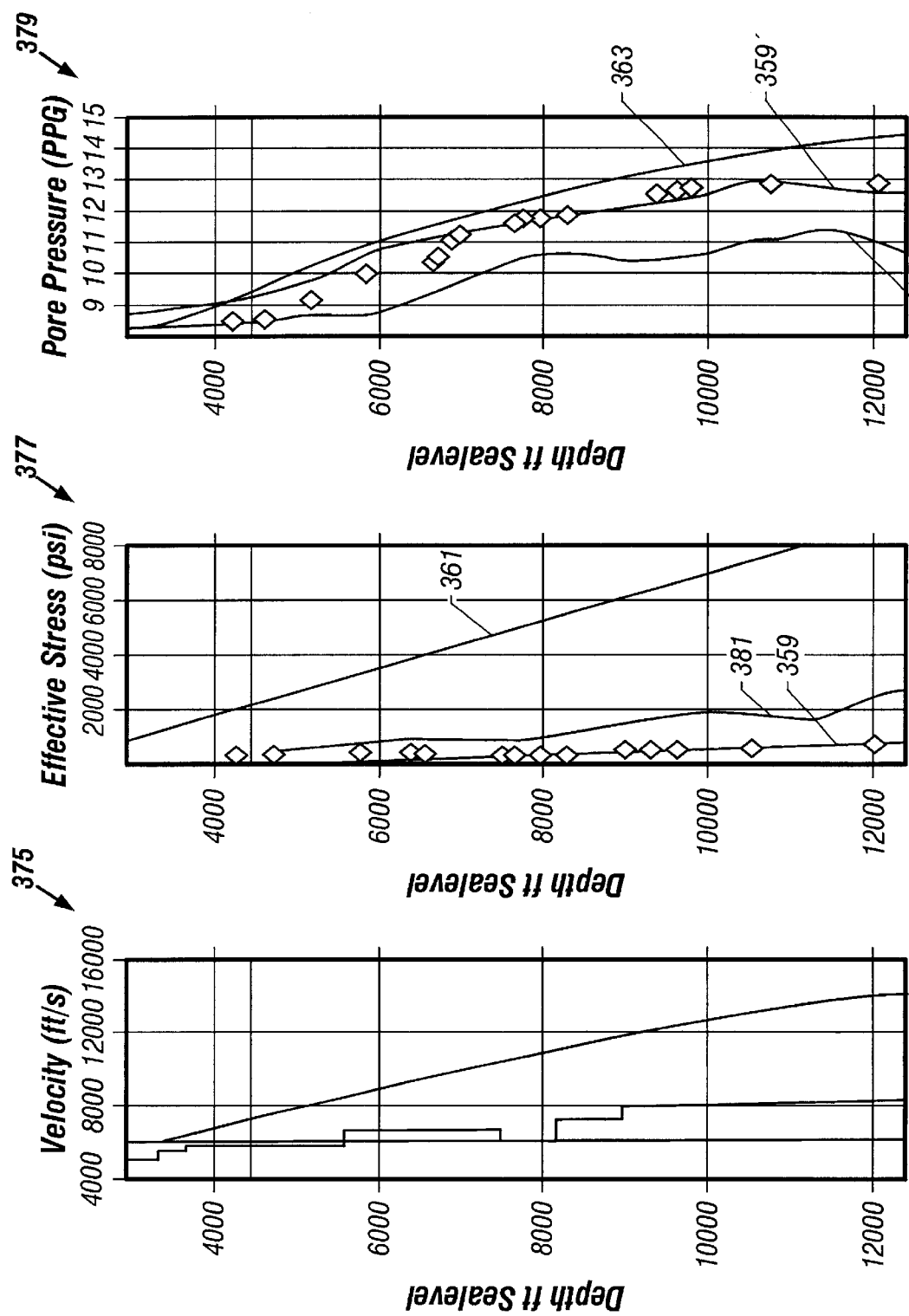
FIG. 15 shows a comparison of an Eaton calibration with a Bowers calibration.

In a manner similar to that described immediately above for the Bowers calibration, the present invention also provides a capability for doing a calibration based on the Eaton relationship. This is not described here, but the end result of an Eaton calibration is shown in FIG. 15 as a comparison with the Bowers calibration. As in FIG. 14, the left panel 375 shows a velocity plot, the middle panel 377 is a plot of effective stress and the right panel 379 is a pore pressure gradient plot. The middle panel shows the effective stress 381 from the Eaton calibration and the right panel shows the pore pressure gradient 381' from the Eaton calibration. It may be seen that the Eaton calibration does not match the data points for the mud weight below about 5000 ft. in both the panels.

The above discussion dealt with the use of data from a well corresponding to a specific calibration location within the areal extent of the seismic data with or without seismic velocity data for the specific well location. As an alternative to deriving the calibration curves, the present invention includes the capability of using a previously determined calibration curve in the analysis of the seismic data using regional information or information from a location that is outside the areal extent of the seismic data.

The above discussion also dealt with the use of density data from well logs to establish an overburden stress. U.S. patent applications Ser. Nos. 09/285,470 filed on Apr. 12, 1999; Ser. No. 09/399,218 filed on Sep. 17, 1999; and Ser. No. 09/580,863 filed on May 30, 2000, all having the same assignee as the present application and the contents of which are fully incorporated herein by reference, teach the use of potential fields data, including scalar, vector or tensor gravity and/or magnetic data, in the determination of densities of subsurface formations in conjunction with seismic data. The teachings of these applications may be used in the present invention for obtaining densities of subsurface formations; as discussed in the aforesaid applications, the density model may be 1-D, 2-D, 2.5-D or 3-D. In addition, U.S. patent application Ser. No. 09/405,850 filed on Sep. 24, 1999 and having the same assignee as the present application, teaches the use of potential fields data in combination with seismic data for obtaining estimates of overburden stresses and effective stresses in subsurface formations. The teachings of the '850 application may also be used in the present invention.

As mentioned above, seismic velocities may be derived in the present invention using many methods. The discussion above relating to FIGS. 8–15 could use velocities from any of these methods. In one embodiment of the invention, the velocities may be derived without reference to seismic horizons defined by the interpreter on a seismic section. In another embodiment of the invention, the seismic velocities are defined with reference to seismic horizons defined by the interpreter.

Figure 16:
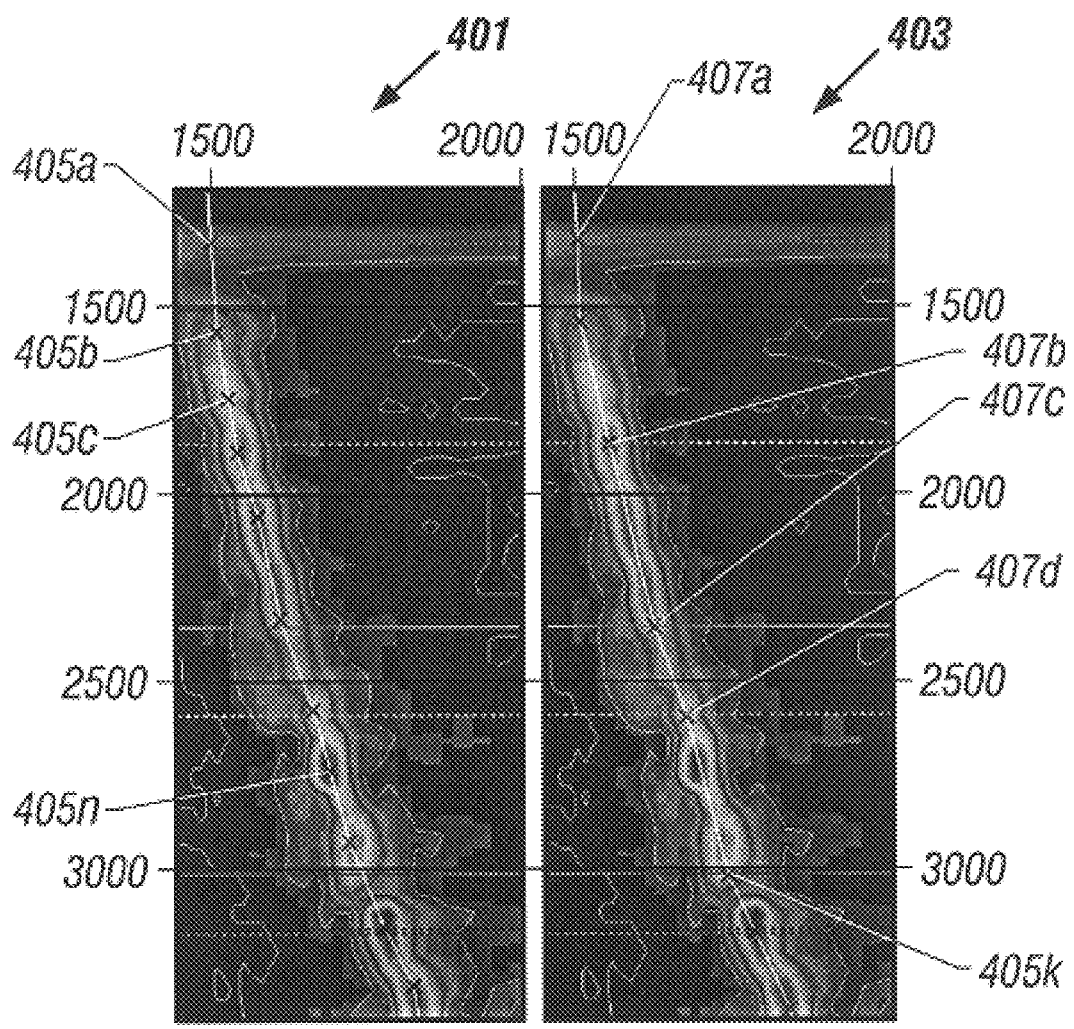
FIG. 16 shows the use of velocity spectra in obtaining seismic velocities over defined seismic interval and a comparison with prior art velocity spectra.

One such method that has been used in the past is the use of velocity spectra for the determination of interval velocities of compressional waves. However, these have been done in prior art without reference to defined seismic horizons. FIG. 16 shows how velocity spectra may be obtained with referencing to defined seismic horizons. The left panel 401 shows conventional velocity spectra for compressional wave data. The vertical axis is seismic travel time and the horizontal axis is the moveout velocity. Plotted in the panel 401 are coherency values of the seismic data at different moveout velocities and times: such spectra would be well known to those versed in the art. In prior art methods, peaks of the spectra such as at times indicated by 405a, 405b, 405c, . . . 405n are picked and seismic interval velocities derived from these peaks using known methods. As would be known to those versed in the art, for causes beyond the scope of the present invention, these peaks do not necessarily coincide with geologically meaningful seismic horizons. The right panel 403 shows the same velocity data with seismic times indicated as 407a, 407b, 407c . . . 407k that correspond to seismic horizons on a seismic section (not shown). In the present invention, coherency values at these times 407a, 407b . . . are picked to define the moveout velocity as a function of depth. These do not necessarily correspond to local peaks of the velocity spectra. The use of horizon keyed velocity spectra of compressional waves is a novel aspect of the present invention. The other methods of determination of seismic velocities described above are believed to be novel with or without the use of horizon keyed picking.

Figure 17:
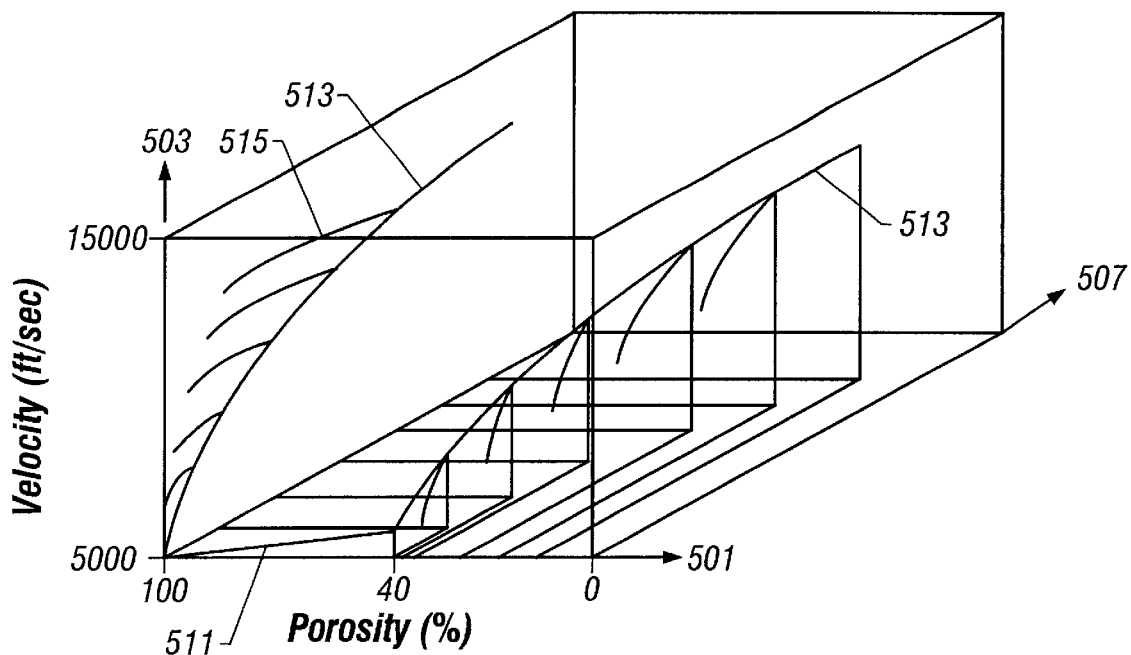
FIG. 17 is a schematic illustration of the effects of unloading.

The present invention also has the capability of accounting for the effect of unloading of the effective stress in the subsurface formations. The effect of unloading is best understood with reference to FIG. 17.

This diagram is a 3-dimensional view that demonstrates the interplay between velocity 503, porosity 501 and effective stress 507. The loading path starts at an effective stress of zero, and the velocity increases and porosity decreases until the material changes over from a Wood's Equation material to a frame-bearing clastic rock that can support an effective stress on the grains. The Wood's Equation portion of the loading path 511 occurs as the material is initially deposited and compacted near the surface. Once the critical porosity such as 512 is reached, the material follows the primary compaction curve 513, achieving either a compacted or undercompacted state. If allowed to compact normally with fluid draining out of the pore spaces, a rock will continue up the normal loading path and velocity will increase and porosity will decrease. Both of these properties are dependent on the effective stress on the grains that are bearing the external load. If at some point the fluid is prevented from escaping, the rate of ascent up the normal pressure curve will decrease so that the rock has a lower velocity and effective stress than would be expected at normal pressure conditions at a given depth of burial. This condition is known as undercompaction or compaction disequilibrium. The key to understanding undercompaction is to recognize that a rock under these conditions still remains on the normal compaction trend, only it is not as compacted as you would expect it to be at that depth of burial under normal hydrostatic pressure.

Unlike undercompaction, a rock subjected to secondary pressure (also called unloading) cannot stay on the normal compaction curve. When fluid is pumped into a rock or expands within the pore spaces in the rock, the compaction process is arrested and the rock begins to display a form of hysteresis behavior in velocity-effective stress space. When this occurs, the porosity essentially doesn't change except for some minor elastic rebound (Moos and Zwart, 1998), and the velocity behavior is strictly controlled by the contact area and the grain-to-grain contact stresses in the rock. Because there is essentially no porosity change, the net effect is to flatten out the velocity-effective stress trend and produce an unloading trend that is different from the compaction trend. The unloading curve must start from the velocity-porosity-effective stress point on the primary compaction curve where the unloading begins. This is why unloading 515 always starts from a porosity-velocity-effective stress point on the primary compaction curve. Note that the unloading paths occur essentially in the velocity-effective stress plane as the porosity decrease associated with compaction is arrested during unloading and very little elastic rebound (less than 1 porosity unit) occurs during the unloading process. As the effective stress decreases due to higher fluid pressures at fixed overburden, the velocity decreases in direct relation to the stress change. Once a rock is on an unloading path, the rock doesn't change porosity unless other phenomena such as diagenesis or cementation are occurring concurrently with the pressure changes. For the rock to begin compacting again, the secondary pressures must first bleed off, or the overburden must increase sufficiently by additional sediment loading to counterbalance the secondary fluid pressures that were added to the rockmass and increase the effective stress. In either case, the rock will respond to the change in effective stress and will move back up the unloading path 515 until it contacts the normal compaction curve again. Once the effective stress has exceeded the value where unloading began, the rock can begin to compact again. If the stress never reaches this level, the rock will remain on the unloading path indefinitely. It is important to recognize in this context that the normal compaction curve is also the maximum compaction, maximum velocity and minimum porosity that a material can achieve at normal pressure for a given effective stress.

To properly predict pressure ahead of the bit, it is essential to know not only the normal compaction trend, but also the slope of the secondary pressure curve and the maximum stress-velocity state that was achieved before unloading began. It is important to recognize that the presence of two possible pressure mechanisms and a range of possible maximum velocities for unloading leads to a range of possible predicted pressures according to which mechanism is assumed to be at work and where unloading began. For any velocity, there are a range of possible pressures that are a function of the normal trend, the maximum velocity attained by the rock, and the unloading curve slope. In practical terms, for any observed velocity value, the minimum pressure case is represented by the normal trend curve (equivalent depth of burial) and the maximum pressure case is represented by the greatest reasonable maximum velocity on the normal trend and the slope of the unloading curve from that point back to the observed velocity value. Thus, it is imperative that the pressure prediction expert be aware of both causes of pressure and also recognize when and how to apply unloading.

Figure 18:
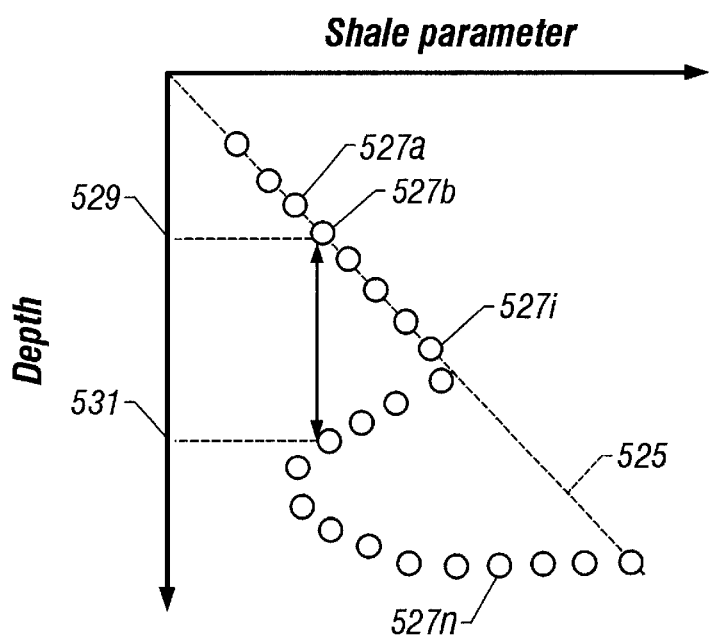
FIG. 18 is an illustration of the equivalent depth method.

Turning now to FIG. 18, the equivalent depth method is illustrated. This method is applicable only for undercompaction and not for modeling the effect of unloading. Shown is a shale parameter (e.g., effective stress, velocity, etc.) plotted as a function of depth. A number of data points 527*a*, 527*b* . . . 527*i* . . . 527*n* are shown along with the normal compaction trend curve 525. Due to rapid burial, the points below 527 are undercompacted, as indicated by the reversal of the trend data. Data from the depth 531 are have the same properties as data along the normal compaction curve at a depth 529. The depth 529 may be referred to as the equivalent depth to 531.

Figure 19A:
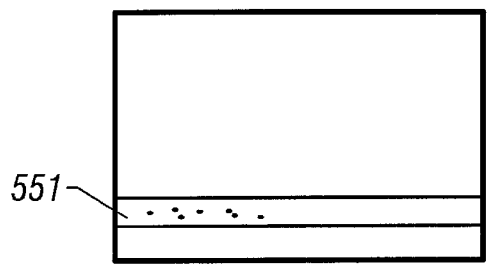
FIGS. 19a–19c illustrate overpressuring that may occur in a thin sand body as a result of rapid burial.
Figure 19B:
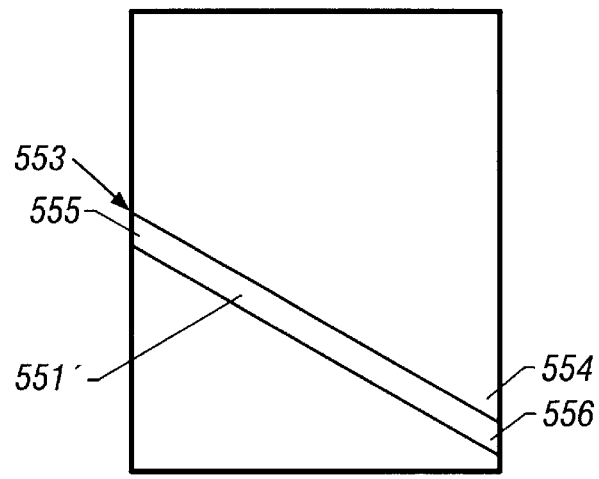
Figure 19C:
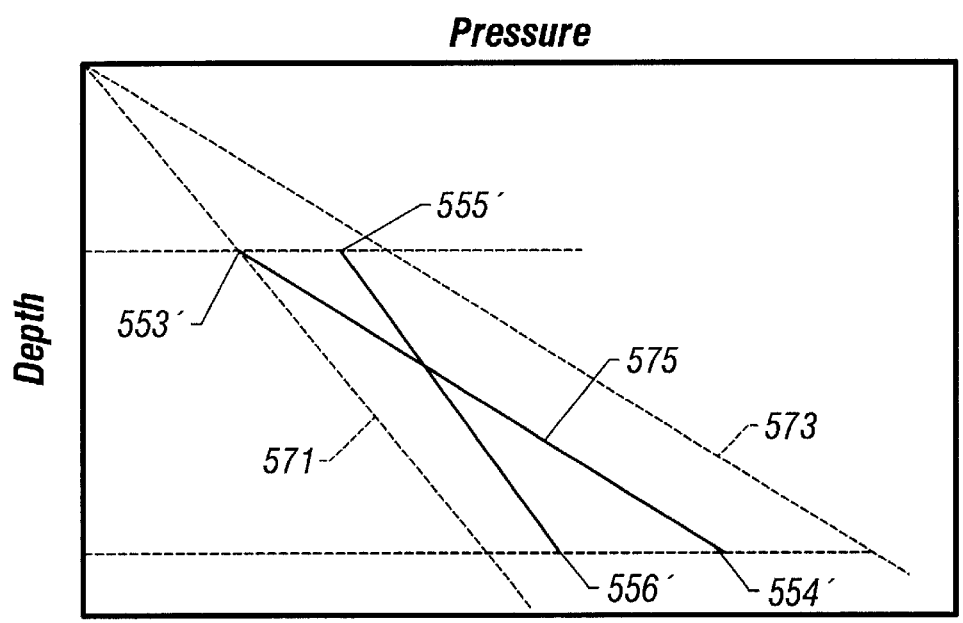

An isolated sand layer within a thick shale that is subjected to rapid burial may have very unusual stress configurations. This is illustrated in FIGS. 19*a*–19*c* (after Stump et al). Consider a sand body 551 as shown in FIG. 19*a* that is initially in a horizontal position and then due to rapid burial at the right end, assumes the configuration shown by 551' in FIG. 19*b*. Consider now the relative pressures between the sand and the shale at the shallow end (points 555, 553) and the deep end (points 556, 554). Normal hydrostatic and lithostatic stress distributions are indicated in FIG. 19*c* by 571 and 573 respectively. The shale 553 at the shallow end is essentially at hydrostatic pressure given by the point 553' while the shale at the deep end 554 is at an abnormally high pressure denoted by the point 554'. (If the subsidence is rapid enough, the shale follows a stress line 575 parallel to the lithostatic line 573). The sand at the deep end will now be at a pressure denoted by 556' but due to the good permeability of the sand, the pressure gradient within the sand will be substantially hydrostatic and the shallow end of the sand will now be at a pressure denoted by 555'. As a result of this, the stress in the sand is greater than the stress in the adjoining shale and, if the difference is large enough, this can lead to a breakdown of any possible sealing strength of the sand-shale interface and any hydrocarbons that may be present in the sand will leak out. Seismic inversion techniques discussed above (prestack, post-stack, PP, PS) are particularly useful in identifying trap integrity problems involving thin sand layers. The use of these methods to isolate the velocity of a high-permeability reservoir zone and then predict pressures as a function of depth or structural position is a preferred embodiment of the present invention.

The stresses determined by using the method of the present invention can thus be used as an indicator of trap integrity in hydrocarbon reservoirs.

Figure 20A:
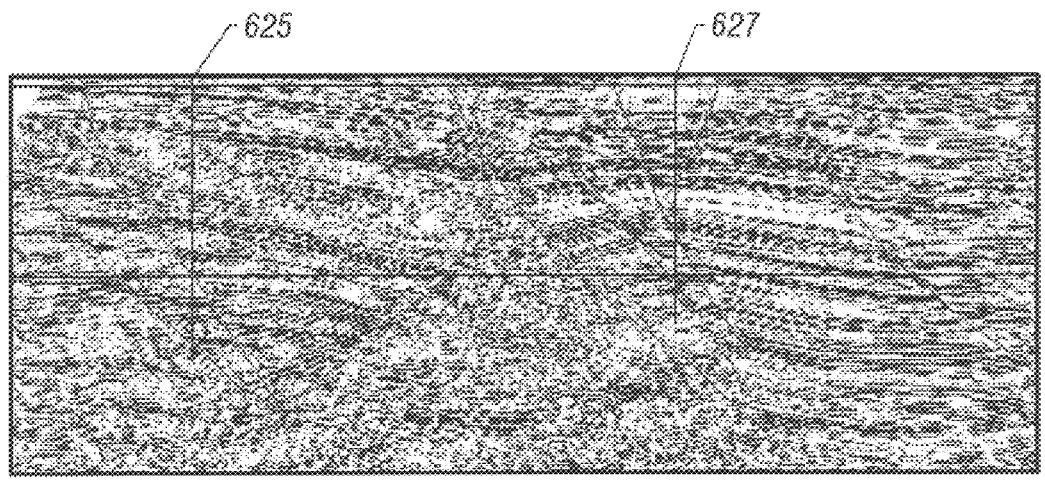
FIGS. 20a–20b is an example of seismic data over a geologically complex prospect and pressure predictions made using the present invention.
Figure 20B:
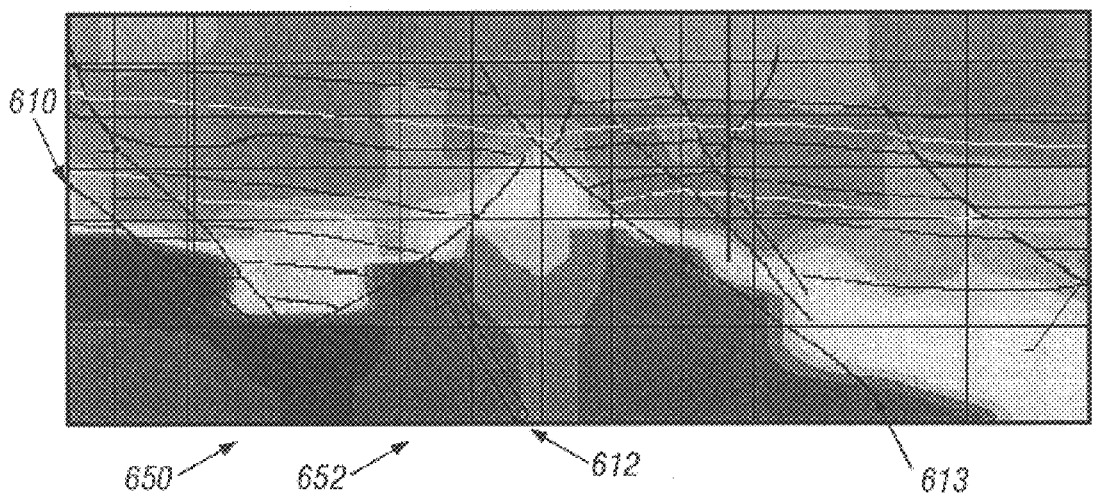

Referring now to FIGS. 20*a* and 20*b*, the seismic data corresponding to FIG. 1 are shown in FIG. 20*a*. The position of the well 25 of FIG. 1 is shown at 625 along with the location of a second well 627, and the locations of the various faults and horizons shown in FIG. 1. FIG. 20*b* is a display of the interpreted fluid pressure in the region encompassed by the seismic data. Based on the display, fault 610 shows a major fault seal failure near the horizontal position indicated by 650 while the fault 612 shows a major fault seal failure near the horizontal position indicated by 652: the pressure is not discontinuous across the faults at the indicated location. In contrast, the figure shows a pressure discontinuity across the fault 613 indicative of fault seal integrity. There also appears to be a somewhat less serious fault leak across the fault 618.

Those versed in the art would recognize that trap integrity may also be used in the vertical direction: a pressure discontinuity across a known reservoir caprock is indicative of vertical integrity of a seal. On the other hand, if pressure appears to be continuous across a caprock, then the trap integrity is questionable.

Use of such displays on a basin wide scale is clearly useful in basin modeling. In addition, using geologic information, it may be possible to identify source rock intervals on a prospect scale or a basin-wide scale. Abnormally high fluid pressures in such source rock intervals are indicative of a secondary buildup of pressure caused by source rock maturation and a subsequent expulsion of hydrocarbons into the rock matrix.

The pressure displays along with knowledge of lithologies associated with different subsurface formations can provide information about the migration of fluids in the subsurface. This is an important diagnostic in prospect evaluation as a trap with a large "drainage" area is likely to contain more hydrocarbons than one with a small drainage area. The pressure displays may also be used to estimate lateral pressure changes within a reservoir. The pressure displays may also be used in the planning of drilling of wellbores: abnormally high fluid pressures indicated on seismic data would indicate the necessity of using higher mud weight in the drilling of a well. This may be used in the analysis of wellbore stability. Abnormally high fluid pressures indicated on seismic data near the ocean bottom are a warning of shallow intervals where blowouts may occur.

Returning now to FIG. 2, the present invention also has the capability of producing maps 59. Any of a plurality of parameters may be displayed on a base map in a manner suitable for helping an interpreter analyze a prospect. For example, displays may be made of a parameter between any two seismic horizons, at any depth or at any seismic reflection time. To facilitate this display, location transforms may be applied 57 on the well positions, the positions of seismic lines, seismic horizons, velocity functions etc. Methods for applying these transforms and producing a suitable map would be known to those versed in the art and are not discussed further.

Figure 21:
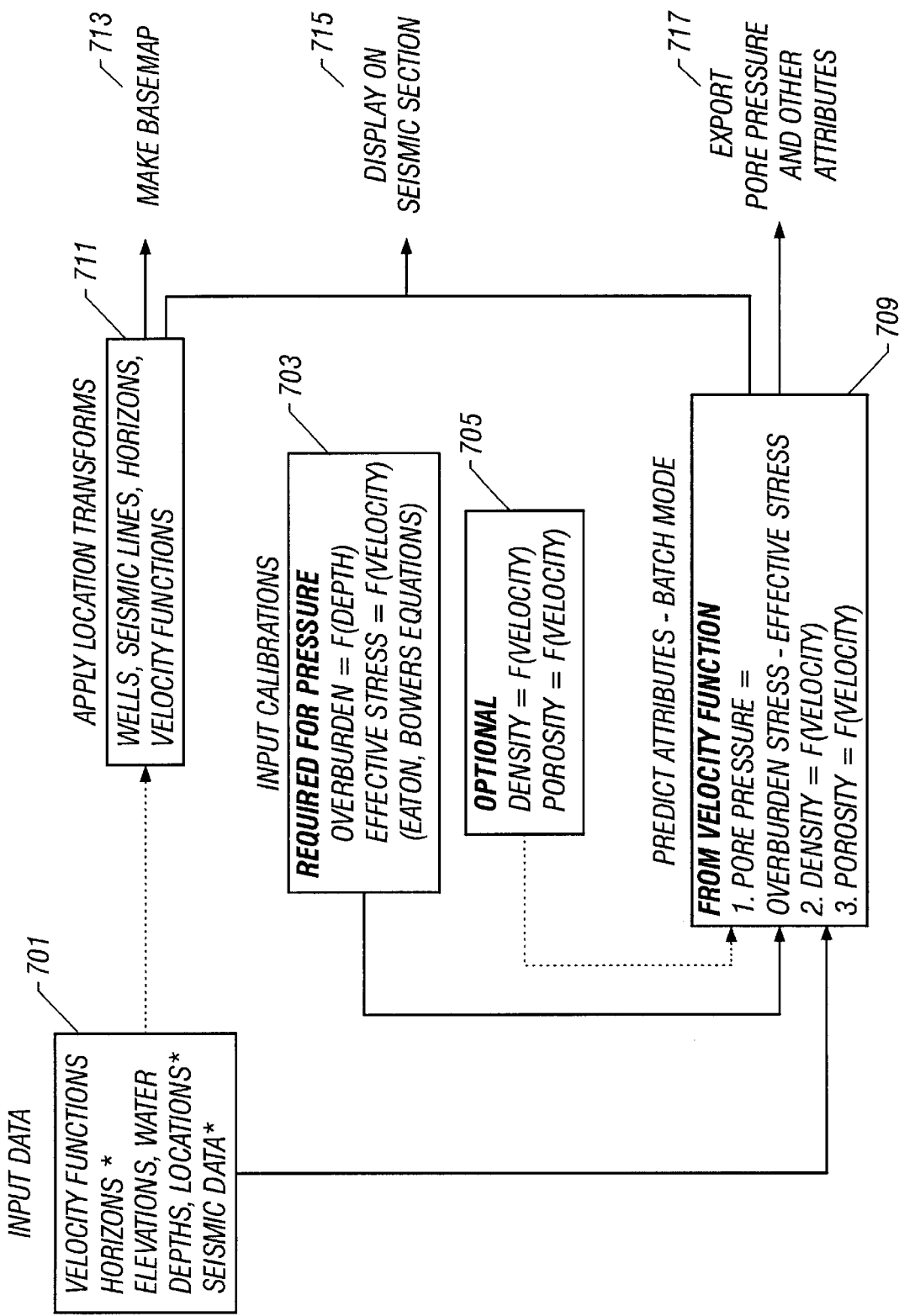
FIG. 21 similar to FIG. 2, is another example of a flow-stream using some of the modules of the present invention FIG. 22 similar to FIGS. 2 and 21, is another example of a flow-stream using some of the modules of the present invention.

Given the variety of modules and options in the present invention, by now those skilled in the art would have recognized that other flow charts besides the one shown in FIG. 2 may be used. FIG. 21 shows a flow chart of operations that are particularly suitable for processing large amounts of data with a minimum of human interaction. Data are input 701 relating to velocity functions, horizons, elevations (for land seismic data) and bathymetry (for marine data), and locations of seismic lines. Predetermined calibrations are input 703 describing the overburden stress as a function of depth and a relation between seismic velocity and effective stress using, e.g, the Bowers, Eaton or other suitable method. Optionally, a density-velocity and porosity-velocity relations may be input 705. Using the velocity functions from 701 and the predetermined calibrations, predictions are made of parameters that may include the pore pressure, density and porosity using any of the methods described above. The predicted parameter values 709 may be exported for use elsewhere 717, and/or displayed on a seismic section 715. In addition, maps may be produced 713 using the location transform information 711.

Figure 22:
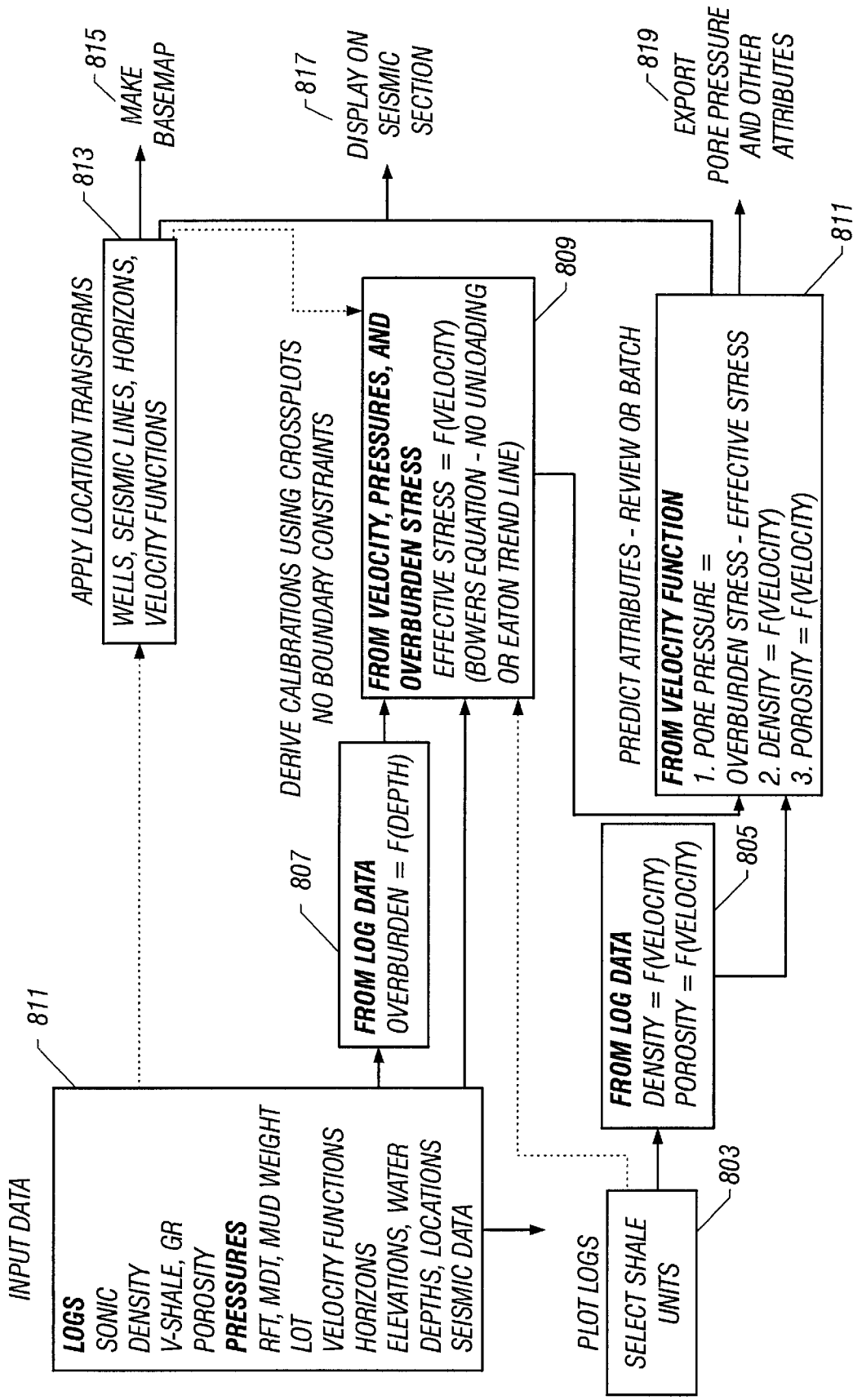

FIG. 22 is a flow chart that may be used in using the basic Bowers or Eaton method. The input data 801comprise logs (e.g., sonic, density, gamma ray, porosity), pressure measurements in a well (RFT, MDT, mud weight, LOT), velocity functions, seismic horizons, elevations (for land data) and bathymetry (for marine data) and seismic data. Shale units are selected 803 as described above with reference to FIG. 2. Density-velocity and porosity-velocity relationships may be derived interactively 805. Overburden stresses are obtained from log data 807 and calibrations using crossplots are derived from the velocity, pressure and overburden stress 809: the Eaton trend line of the Bowers method without unloading may be used. The derived calibrations are used to predict the pore pressure, density, and/or porosity or other selected parameters 811. The predictions of parameters of interest may be exported 819 or displayed on a seismic section 817. Basemaps may be produced 815 using location transforms 813.

Figure 23:
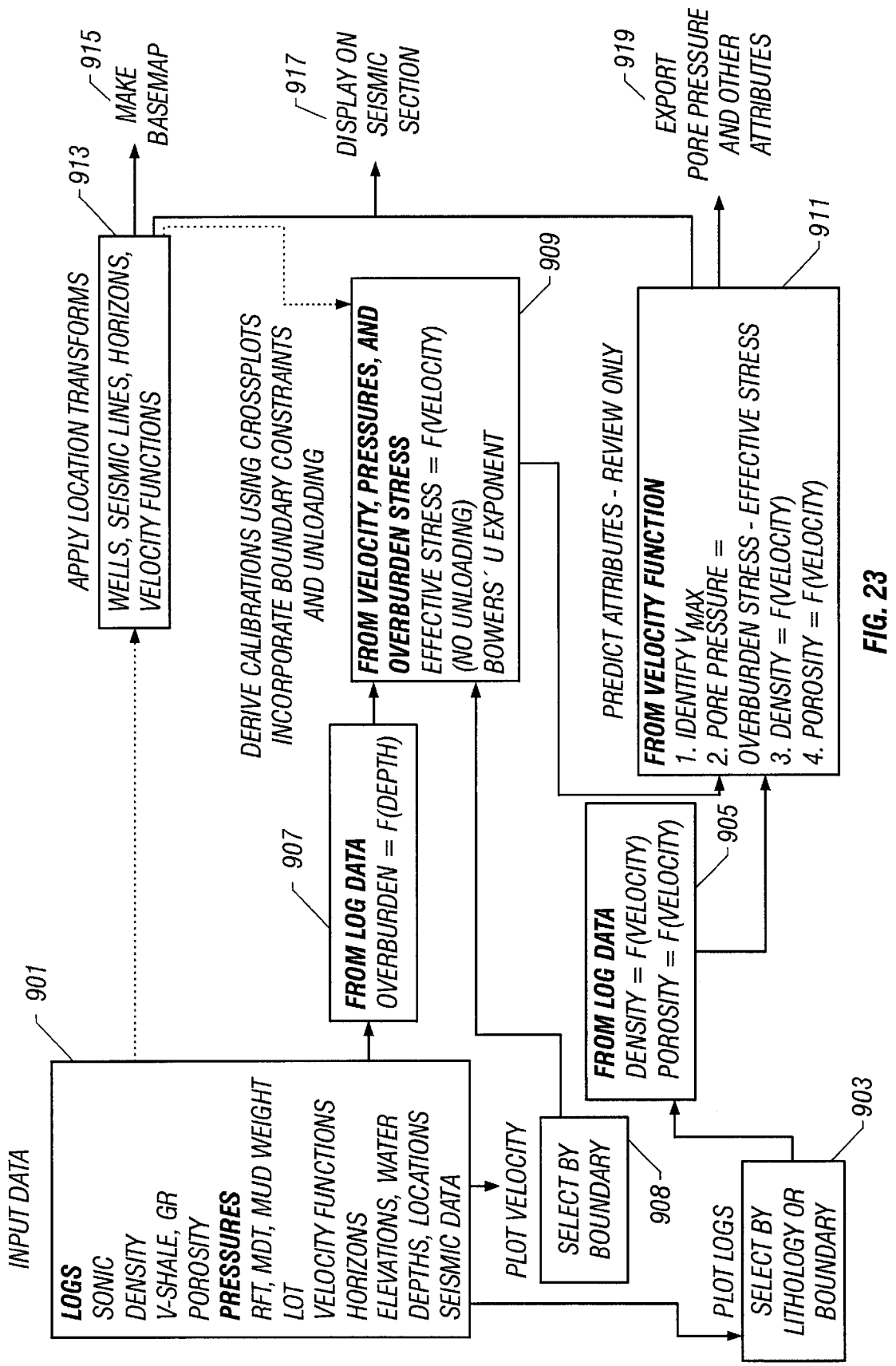
FIG. 23 similar to FIGS. 2, 21 and 22, is yet another example of a flow-stream using some of the modules of the present invention.

The flow chart of FIG. 23 shows input data 901 comprising logs (e.g., sonic, density, gamma ray, porosity), pressure measurements in a well (RFT, MDT, mud weight, LOT), velocity functions, seismic horizons, elevations (for land data) and bathymetry (for marine data) and seismic data. Plots of logs are obtained, selected by lithology or by boundaries 903. Density-velocity and porosity-velocity trends may be obtained 905. An overburden calculation is made 907 using log data. Seismic velocities are obtained between defined horizons 908 and when combined with the overburden data 907 can be used to derive calibrations incorporating boundary constraints as well as the effects of unloading 909. The calibrations 909 are then used to predict attributes 911 that may then be exported 919 or displayed on a seismic section 917. As in FIGS. 22–23, location transforms may be applied 913 and basemaps produced.

The foregoing description has been limited to specific embodiments of this invention. It will be apparent, however, that variations and modifications may be made to the disclosed embodiments, with the attainment of some or all of the advantages of the invention. Therefore, it is the object of the appended claims to cover all such variations and modifications as come within the true spirit and scope of the invention.

What is claimed is:

1. A method for determining a parameter of interest of a subsurface region of earth formations comprising:
   (a) obtaining seismic survey information about the subsurface region;
   (b) identifying a plurality of interpreted seismic horizons of interest from the obtained survey information;
   (c) obtaining estimated seismic velocities corresponding to at least one interval between at least one pair of said plurality of seismic horizons;
   (d) calibrating the estimated seismic velocities to the parameter of interest
   (e) using the results of said calibration and the obtained seismic velocities to obtain the parameter of interest at any location within the seismic survey.

2. The method of claim 1 wherein calibrating the estimated seismic velocities further comprises at least one of:
   (i) using a function determined independently from the seismic data using regional information;
   (ii) using data from a well corresponding to a specific calibration location that is outside the areal extent of the seismic velocity data;
   (iii) using data from a well corresponding to a specific calibration location within the areal extent of the seismic velocity data;
   (iv) using data from a well corresponding to a specific calibration location within the areal extent of the seismic velocity data combined with the velocity data from the seismic survey for the same said location.

3. The method of claim 2 where the calibrating the estimated seismic velocities includes the estimation of an overburden-depth relationship that is determined by integrating density data from at least one of:
   I. a 1-D density function derived from density logs from at least one well;
   II. a 1-D density function derived from density data from drop cores, side-wall cores or conventional cores;
   III. a spatially varying density function based on the inversion of potential fields data, said potential fields data comprising at least one of gravity data, and magnetic data;
   IV. a density function derived by performing inversion of at least one of PP data, and PS data.

4. The method of claim 1 wherein obtaining estimated seismic velocities further comprises using specific seismic pre-processing techniques including at least one of:
   (i) Dip Move out (DMO)
   (ii) Pre-stack time migration
   (iii) Pre-stack depth migration
   (iv) Multiple attenuation or suppression
   (v) Reflectionstatics
   (vi) Refraction statics
   (vii) Wavefield reconstruction
   (viii) The combination in undersampled seismic data from several gathers to form super-gathers.

5. The method of claim 1 wherein the parameter of interest is selected from the group consisting of:
   (i) fluid pressure
   (ii) fracture gradient
   (iii) overburden pressure
   (iv) effective stress
   (v) excess pressure, defined as the difference between the actual fluid pressure and the normal pressure for the same depth.

6. The method of claim 5 further comprising using the parameter of interest for performing further analysis at one of the following scales:
   I. the scale of a specific well location, defined as a projected one-dimensional path that will be used to place a wellbore into the subsurface
   II. the scale of an exploration prospect
   III. the scale of a regional pressure evaluation to understand hydrocarbon systems.

7. The method of claim 5 further comprising using the parameter of interest for performing specific analyses of the subsurface including at least one of the following:
   I. basin modeling
   II. hydrocarbon maturation in source rock intervals
   III. lateral and vertical seal rock integrity
   IV. fault seal integrity
   V. evaluation of fluid migration pathways in the subsurface
   VI. reservoir-specific lateral pressure changes
   VII. shallow water flow risk evaluation
   VIII. wellbore stability and failure analysis.

8. The method of claim 1 wherein the seismic survey comprises one of:
   (i) P-wave land seismic data
   (ii) S-wave land seismic data
   (iii) mode-converted S-wave land data (land PS data)
   (iv) mode-converted S-wave marine ocean-bottom cable data (marine PS data)
   (v) P-wave marine streamer data
   (vi) P-wave marine ocean bottom cable data (PP data).

9. The method of claim 1 wherein the obtained seismic velocities are selected from the group consisting of:
   (i) P-wave velocity data generated from normal moveout (NMO) velocity analysis
   (ii) P-wave or S-wave velocity data generated from coherency inversion analysis
   (iii) P-wave velocity generated from pre-stack inversion
   (iv) P-wave velocity generated from post-stack inversion
   (v) S-wave velocity generated from pre-stack inversion
   (vi) S-wave velocity generated from post-stack inversion
   (vii) S-wave velocity data generated from normal moveout (NMO) velocity analysis
   (viii) P-wave velocity generated from tomography
   (ix) S-wave velocity generated from tomography
   (x) P-wave velocity data from vertical seismic profiling (VSP)
   (xi) P-wave velocity data from VSP look-ahead inversion
   (xiii) S-wave velocity data from vertical seismic profiling (VSP)
   (xiv) S-wave velocity data from VSP look-ahead inversion.

10. The method of claim 2 wherein the data from a well comprises at least one of:
   I. sonic logs
   II. shear sonic logs
   III. density logs
   IV. Lithology logs in the form of gamma ray or Spontaneous Potential logs
   V. formation fluid pressure data (further dependent claims)
   VI. formation fracture pressures in the form of Leak Off Tests.

11. The method of claim 1 wherein using the results of said calibration and the obtained seismic velocities to obtain the parameter of interest further comprises using at least one of:
   (ii) the Eaton method
   (ii) the effective stress method
   (iii) the equivalent depth method.

12. The method of claim 1 wherein calibrating the estimated seismic velocities further comprises using at least one of:
   (i) a linear curve fitting
   (ii) a curve fitting based on a power law
   (iii) a curve fitting based on exponentials,
   (iv) a quadratic curve fitting.

13. The method of claim 12 wherein calibrating the estimated seismic velocities further comprises:
   using an interactive display, said interactive display allowing modification of a displayed calibration curve and observing changes in a plurality of other displayed curves simultaneously, said interactive display further allowing at least one of:
      I. manually changing a coefficient or exponent in the fitting equation, and
      II. using a cursor to graphically manipulate the fitting curve.

14. The method of claim 1 further comprising:
   obtaining a porosity calibration curve from well data using at least one of:
      (i) editing of erroneous porosity values for at least one well;
      (ii) displaying in a single plot, a depth-correlated porosity and velocity data for the at least one well;
      (iii) curve fitting of the velocity and porosity data using at least one of:
         I. a linear curve fitting
         II. a curve fitting based on a power law
         III. a curve fitting based on exponentials,
         IV. a quadratic curve fitting; and
   predicting porosity at a specified location using the obtained porosity calibration curve and the seismic velocity data from the specified location.

15. The method of claim 1 wherein the parameter of interest is a fracture gradient, the method further comprising:
   (i) deleting erroneous leak-off test values for at least one well;
   (ii) displaying depth-correlated leak-off test and overburden data for the at least one well, and
   (iii) applying one of the two following methods
      I. curve fitting of the leak off test data to determine a fracture gradient, and
      II. applying an appropriate stress ratio (Ko) to fit the leak-off test data.

16. The method of claim 1 further comprising displaying the parameter of interest on one of:
   (i) stacked seismic section, and
   (ii) migrated seismic section.

17. The method of claim 1 further comprising displaying the parameter of interest interactively and simultaneously on at least one of:
   (i) a seismic display;
   (ii) a velocity versus depth display including a velocity function for a specific location and a calibration function for velocity versus effective stress,
   (iii) a stress versus depth display including the overburden stress calibration for said specific location and the effective stress calculated from the velocity versus depth display,
   (iv) a pressure-gradient versus depth display including the fracture gradient or overburden gradient, the fluid pressure gradient calculated from the stress versus depth display, and pressure data points from a well that applies to said specific location.

18. The method of claim 1 wherein the at least one pair of the plurality of seismic horizons comprises at least two pairs, the method further comprising performing step (d) of claim 1 separately for each of the at least two pairs of seismic horizons.

19. The method of claim 1 further comprising displaying the parameter of interest in at least one of:
   (i) a tabular display; and
   (ii) a graphical display.

20. The method of claim 1 wherein calibrating the estimated seismic velocities further comprises:
   (i) deleting or correcting for zones of abnormal velocity caused by the presence of hydrocarbon fluids; and
   (ii) deleting zones of abnormal velocity caused by the presence of nonelastic rocks.

21. The method of claim 1 further comprising at least one of:
   (i) determining an overburden stress from a density function based on inversion of 2-D or 3-D potential fields;
   (ii) determining an overburden stress from a density function derived by performing a simultaneous inversion of PP and PS data;
   (iii) correcting for zones of abnormal density caused by the presence of hydrocarbon fluids by inserting a correct density for said zones and recalculating the overburden at the specific location;
   (iv) correcting for zones of abnormal velocity caused by the presence of hydrocarbon fluids by deleting said zones from the calculation of the parameter of interest;
   (v) correcting for zones of abnormal density caused by the presence of non-clastic rocks by inserting a correct density for said zones and recalculating the overburden at the specific location; and
   (vi) correcting for zones of abnormal velocity caused by the presence of non-clastic rocks by deleting said zones from the calculation of the parameter of interest.

22. The method of claim 1 further comprising at least one of:
   (i) using an interactive help menu;
   (ii) performing a coordinate transformation; and
   (iii) automatically propagating results of an editing.

23. The method of claim 3 wherein the calibration includes the estimation of an overburden-depth relationship that is determined by integrating density data obtained by inversion of 2-D or 3-D potential fields data.

24. The method of claim 3 wherein the calibration includes the estimation of an overburden-depth relationship that is determined by integrating density data obtained by inversion of at least one of 2-D or 3-D seismic data, and wherein said seismic data further comprise at least one of PP data and PS data.

25. A method for determining a parameter of interest of a subsurface region of earth formations comprising:
   (a) obtaining seismic survey information about the subsurface region;
   (b) obtaining estimated seismic velocities corresponding to at least one interval of the subsurface from:
      (i) coherency inversion analysis of P-wave or S-wave seismic data;
      (ii) pre-stack inversion of P-wave seismic data;
      (iii) post-stack inversion of P-wave seismic data;
      (iv) pre-stack inversion of S-wave seismic data;
      (v) post-stack inversion of S-wave seismic data;
      (vi) normal moveout (NMO) velocity analysis of S-wave seismic data;
      (vii) tomographic analysis of P-wave seismic data;
      (viii) tomographic analysis of S-wave seismic data;
      (ix) analysis of P-wave data from vertical seismic profiling (VSP) data;
      (x) analysis of P-wave data from inversion of VSP look-ahead data;
      (xi) analysis of S-wave data from vertical seismic profiling (VSP) data
      (xii) analysis of S-wave data from inversion of VSP look-ahead data;
   (c) calibrating the estimated seismic velocities to the parameter of interest
   (d) using the results of said calibration and the obtained seismic velocities to obtain the parameter of interest at any location within the seismic survey.

26. The method of claim 25 wherein calibrating the estimated seismic velocities further comprises at least one of:
   (i) using a function determined independently from the seismic data using regional information;
   (ii) using data from a well corresponding to a specific calibration location that is outside the areal extent of the seismic velocity data;
   (iii) using data from a well corresponding to a specific calibration location within the areal extent of the seismic velocity data;
   (iv) using data from a well corresponding to a specific calibration location within the areal extent of the seismic velocity data combined with the velocity data from the seismic survey for the same said location.

27. The method of claim 26 where calibrating the estimated seismic velocities includes further comprises estimating an overburden-depth relationship by integrating density data from at least one of:
   I. a 1-D density function derived from density logs from at least one well;
   II. a 1-D density function derived from density data from drop cores, side-wall cores or conventional cores;
   III. a spatially varying density function based on the inversion of potential fields data, said potential fields data comprising at least one of gravity data, and magnetic data;
   IV. a density function derived by performing an inversion of at least one of PP data, and PS data.

28. The method of claim 25 wherein obtaining seismic velocity data further comprises using seismic processing techniques that include at least one of:
   (i) Dip Move out (DMO)
   (ii) Pre-stack time migration
   (iii) Pre-stack depth migration
   (iv) Multiple attenuation or suppression
   (v) Reflection statics
   (vi) Refraction statics
   (vii) Wavefield reconstruction
   (viii) The combination in undersampled seismic data from several gathers to form super-gathers.

29. The method of claim 25 wherein the parameter of interest is selected from the group consisting of:
   (i) fluid pressure
   (ii) fracture gradient
   (iii) overburden pressure
   (iv) effective stress
   (v) excess pressure, defined as the difference between the actual fluid pressure and the normal pressure for the same depth.

30. The method of claim 25 further comprising using the parameter of interest to perform further analysis at one of the following scales:
  I. the scale of a specific well location, defined as a projected one-dimensional path that will be used to place a wellbore into the subsurface
  II. the scale of an exploration prospect
  III. the scale of a regional pressure evaluation to understand hydrocarbon systems.

31. The method of claim 26 further comprising using the parameter of interest for performing specific analyses of the subsurface including at least one of the following:
  I. basin modeling
  II. hydrocarbon maturation in source rock intervals
  III. lateral and vertical seal rock integrity
  IV. fault seal integrity
  V. evaluation of fluid migration pathways in the subsurface
  VI. reservoir-specific lateral pressure changes
  VII. shallow water flow risk evaluation
  VIII. wellbore stability and failure analysis.

32. The method of claim 25 wherein the seismic survey comprises one of:
  (i) P-wave land seismic data
  (ii) S-wave land seismic data
  (iii) mode-converted S-wave land data (land PS data)
  (iv) mode-converted S-wave marine ocean-bottom cable data (marine PS data)
  (v) P-wave marine streamer data
  (vi) P-wave marine ocean bottom cable data (PP data).

33. The method of claim 26 wherein the data from a well comprises at least one of:
  I. sonic logs
  II. shear sonic logs
  III. density logs
  IV. Lithology logs in the form of gamma ray or Spontaneous Potential logs
  V. formation fluid pressure data (further dependent claims)
  VI. formation fracture pressures in the form of Leak Off Tests.

34. The method of claim 25 wherein using the results of said calibration and the obtained seismic velocities to obtain the parameter of interest further comprises using at least one of:
  (ii) the Eaton method
  (ii) the effective stress method
  (iii) the equivalent depth method.

35. The method of claim 25 wherein calibrating the estimated seismic velocities further comprises using at least one of:
  (i) a linear curve fitting
  (ii) a curve fitting based on a power law
  (iii) a curve fitting based on exponentials
  (iv) a quadratic curve fitting.

36. The method of claim 26 wherein calibrating the estimated seismic velocities further comprises:
  using an interactive display, said interactive display allowing modification of a displayed calibration curve and observing changes in a plurality of other displayed curves simultaneously, said interactive display further allowing at least one of:
    I. manually changing a coefficient or exponent in the fitting equation, and
    II. using a cursor to graphically manipulate the fitting curve.

37. The method of claim 25 further comprising:
  obtaining a porosity calibration curve from well data using at least one of:
    (i) editing of erroneous porosity values for at least one well;
    (ii) displaying in a single plot, a depth-correlated porosity and velocity data for the at least one well;
    (iii) curve fitting of the velocity and porosity data using at least one of:
      I. a linear curve fitting
      II. a curve fitting based on a power law
      III. a curve fitting based on exponentials,
      IV. a quadratic curve fitting; and
  predicting porosity at a specified location using the obtained porosity calibration curve and the seismic velocity data from the specified location.

38. The method of claim 25 wherein the parameter of interest is a fracture gradient, the method further comprising:
  (i) deleting erroneous leak-off test values for at least one well;
  (ii) displaying depth-correlated leak-off test and overburden data for the at least one well, and
  (iii) applying one of the two following methods:
    I. curve fitting of the leak off test data to determine a fracture gradient, and
    II. applying an appropriate stress ratio (Ko) to fit the leak-off test data.

39. The method of claim 25 further comprising displaying the parameter of interest on one of:
  (i) stacked seismic section, and
  (ii) migrated seismic section.

40. The method of claim 25 further comprising displaying the parameter of interest interactively and simultaneously on at least one of:
  (i) a seismic display
  (ii) a velocity versus depth display including a velocity function for a specific location and a calibration function for velocity versus effective stress,
  (iii) a stress versus depth display including the overburden stress calibration for said specific location and the effective stress calculated from the velocity versus depth display,
  (iv) a pressure-gradient versus depth display including the fracture gradient or overburden gradient, the fluid pressure gradient calculated from the stress versus depth display, and pressure data points from a well that applies to said specific location.

41. The method of claim 25 wherein the at least one pair of the plurality of seismic horizons comprises at least two pairs, the method further comprising performing step (d) of claim 1 separately for each of the at least two pairs of seismic horizons.

42. The method of claim 25 further comprising displaying the parameter of interest in at least one of:
  (i) a tabular display; and
  (ii) a graphical display.

43. The method of claim 25 wherein calibrating the estimated seismic velocities at a specific location further comprises:
  (i) deleting or correcting for zones of abnormal velocity caused by the presence of hydrocarbon fluids; and (ii) deleting zones of abnormal velocity caused by the presence of nonelastic rocks.

44. The method of claim 25 further comprises using at least one of:
  (i) determining an overburden stress from a density function based on inversion of 2-D or 3-D potential fields;
  (ii) determining an overburden stress from a density function derived by performing a simultaneous inversion of PP and PS data;
  (iii) correcting for zones of abnormal density caused by the presence of hydrocarbon fluids by inserting a correct density for said zones and recalculating the overburden at the specific location;
  (iv) correcting for zones of abnormal velocity caused by the presence of hydrocarbon fluids by deleting said zones from the calculation of the parameter of interest;
  (v) correcting for zones of abnormal density caused by the presence of non-clastic rocks by inserting a correct density for said zones and recalculating the overburden at the specific location; and
  (vi) correcting for zones of abnormal velocity caused by the presence of non-clastic rocks by deleting said zones from the calculation of the parameter of interest.

45. The method of claim 25 further comprising at least one of:
  (i) using an interactive help menu;
  (ii) performing a coordinate transformation; and
  (iii) automatically propagating results of an editing.

46. The method of claim 27 wherein the calibration includes the estimation of an overburden-depth relationship that is determined by integrating density data obtained by inversion of 2-D or 3-D potential fields data.

47. The method of claim 27 wherein the calibration includes the estimation of an overburden-depth relationship that is determined by integrating density data obtained by inversion of at least one of 2-D or 3-D seismic data, and wherein said seismic data further comprise at least one of PP data and PS data.

48. A method for determining fluid pressure in a subsurface region of earth formations comprising:
  (a) obtaining seismic survey information about the subsurface region;
  (b) identifying a plurality of interpreted seismic horizons of interest from the obtained survey information;
  (c) obtaining estimated seismic velocities corresponding to at least one interval between at least one pair of said plurality of seismic horizons;
  (d) calibrating the estimated seismic velocities to the parameter of interest
  (e) using the results of said calibration and the obtained seismic velocities to obtain the parameter of interest at any location within the seismic survey.

49. A method for determining an effective stress in a subsurface region of earth formations comprising:
  (a) obtaining seismic survey information about the subsurface region;
  (b) identifying a plurality of interpreted seismic horizons of interest from the obtained survey information;
  (c) obtaining estimated seismic velocities corresponding to at least one interval between at least one pair of said plurality of seismic horizons;
  (d) calibrating the estimated seismic velocities to the parameter of interest
  (e) using the results of said calibration and the obtained seismic velocities to obtain the parameter of interest at any location within the seismic survey.

50. A method for determining fluid pressure in a subsurface region of earth formations comprising:
  (a) obtaining seismic survey information about the subsurface region;
  (b) obtaining estimated seismic velocities corresponding to at least one interval of the subsurface from:
    (i) coherency inversion analysis of P-wave or S-wave seismic data;
    (ii) pre-stack inversion of P-wave seismic data;
    (iii) post-stack inversion of P-wave seismic data;
    (iv) pre-stack inversion of S-wave seismic data;
    (v) post-stack inversion of S-wave seismic data;
    (vi) normal moveout (NMO) velocity analysis of S-wave seismic data;
    (vii) tomographic analysis of P-wave seismic data;
    (viii) tomographic analysis of S-wave seismic data;
    (ix) analysis of P-wave data from vertical seismic profiling (VSP) data;
    (x) analysis of P-wave data from inversion of VSP look-ahead data;
    (xi) analysis of S-wave data from vertical seismic profiling (VSP) data
    (xii) analysis of S-wave data from inversion of VSP look-ahead data;
  (c) calibrating the estimated seismic velocities to the parameter of interest
  (d) using the results of said calibration and the obtained seismic velocities to obtain the parameter of interest at any location within the seismic survey.

51. A method for determining an effective stress in a subsurface region of earth formations comprising:
  (a) obtaining seismic survey information about the subsurface region;
  (b) obtaining estimated seismic velocities corresponding to at least one interval of the subsurface from:
    (i) coherency inversion analysis of P-wave or S-wave seismic data;
    (ii) pre-stack inversion of P-wave seismic data;
    (iii) post-stack inversion of P-wave seismic data;
    (iv) pre-stack inversion of S-wave seismic data;
    (v) post-stack inversion of S-wave seismic data;
    (vi) normal moveout (NMO) velocity analysis of S-wave seismic data;
    (vii) tomographic analysis of P-wave seismic data;
    (viii) tomographic analysis of S-wave seismic data;
    (ix) analysis of P-wave data from vertical seismic profiling (VSP) data;
    (x) analysis of P-wave data from inversion of VSP look-ahead data;
    (xi) analysis of S-wave data from vertical seismic profiling (VSP) data
    (xii) analysis of S-wave data from inversion of VSP look-ahead data;
  (c) calibrating the estimated seismic velocities to the parameter of interest
  (d) using the results of said calibration and the obtained seismic velocities to obtain the parameter of interest at any location within the seismic survey.

\* \* \* \* \*

UNITED STATES PATENT AND TRADEMARK OFFICE
CERTIFICATE OF CORRECTION

PATENT NO.      : 6,473,696 B1
DATED           : October 29, 2002
INVENTOR(S)     : Ernest C. Onyia et al.

It is certified that error appears in the above-identified patent and that said Letters Patent is hereby corrected as shown below:

Title page,
Item [63], Related U.S. Application Data, please delete "Continuation of application No. 09/443,446, filed on Nov. 4, 1999".

Column 1,
Line 4, Cross-Reference to Related Application, please delete "a continuation of" and insert -- related to --.

Signed and Sealed this

First Day of July, 2003

JAMES E. ROGAN
*Director of the United States Patent and Trademark Office*